US011887285B2

(12) United States Patent
Tichelaar et al.

(10) Patent No.: US 11,887,285 B2
(45) Date of Patent: *Jan. 30, 2024

(54) ENCODING AND DECODING HDR VIDEOS

(71) Applicant: KONINKLIJKE PHILIPS N.V., Eindhoven (NL)

(72) Inventors: Johannes Yzebrand Tichelaar, Eindhoven (NL); Johannes Gerardus Rijk Van Mourik, Eindhoven (NL); Jeroen Hubert Christoffel Jacobus Stessen, Eindhoven (NL); Roeland Focco Everhard Goris, Veldhoven (NL); Mark Jozef Willem Mertens, Eindhoven (NL); Patrick Luc Els Vandewalle, Oud-Turnhout (NL); Rutger Nijland, Someren-Eind (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 18/102,792

(22) Filed: Jan. 30, 2023

(65) Prior Publication Data
US 2023/0177659 A1 Jun. 8, 2023

Related U.S. Application Data

(63) Continuation of application No. 17/061,937, filed on Oct. 2, 2020, now Pat. No. 11,593,922, which is a
(Continued)

(30) Foreign Application Priority Data

Apr. 14, 2016 (EP) ..................................... 16165406

(51) Int. Cl.
G06T 5/00 (2006.01)
H04N 19/186 (2014.01)
H04N 19/60 (2014.01)

(52) U.S. Cl.
CPC ........... *G06T 5/007* (2013.01); *H04N 19/186* (2014.11); *H04N 19/60* (2014.11); *G06T 2207/10016* (2013.01); *G06T 2207/10024* (2013.01)

(58) Field of Classification Search
CPC ........... G06T 5/007; G06T 2207/10016; G06T 2207/10024; H04N 19/186; H04N 19/60; H04N 19/30; H04N 19/85
(Continued)

(56) References Cited

U.S. PATENT DOCUMENTS 8,014,445 B2 * 9/2011 Segall .................... H04N 19/61
375/240.01
9,288,489 B2 3/2016 Mertens
(Continued)

FOREIGN PATENT DOCUMENTS

EP 1827024 8/2007
EP 1827024 A1 * 8/2007 ........... H04N 19/184
(Continued)

OTHER PUBLICATIONS

Goris, R. et al., "Philips response to Cfe for HDR and WCG", 112 MPEG Meeting, 2015, Warsaw, Poland.
(Continued)

*Primary Examiner* — Mahendra R Patel

(57) ABSTRACT

To enable a high quality HDR video communication, which can work by sending corresponding LDR images potentially via established LDR video communication technologies, which works well in practical situations, applicant has invented a HDR video decoder (600, 1100) arranged to
(Continued)

calculate a HDR image (Im_RHDR) based on applying to a received 100 nit standard dynamic range image (Im_RLDR) a set of luminance transformation functions, the functions comprising at least a coarse luminance mapping (FC), which is applied by a dynamic range optimizer (603), and a mapping of the darkest value (0) of an intermediate luma (Y'HPS), being output of the dynamic range optimizer, to a received black offset value (Bk_off) by a range stretcher (604), the video decoder comprising a gain limiter (611, 1105) arranged to apply an alternate luminance transformation function to calculate a subset (502) of the darkest luminances of the HDR image, from corresponding darkest lumas (Y'_in) of the standard dynamic range image.

17 Claims, 13 Drawing Sheets

Related U.S. Application Data continuation of application No. 16/085,087, filed as application No. PCT/EP2017/056055 on Mar. 15, 2017, now Pat. No. 10,803,562.

(60) Provisional application No. 62/310,233, filed on Mar. 18, 2016.

(58) Field of Classification Search
USPC .......................................................... 382/162
See application file for complete search history.

(56) References Cited

U.S. PATENT DOCUMENTS

| | | | | |
|---|---|---|---|---|
| 2007/0115360 A1* | 5/2007 | Biagiotti | ................ | H04N 17/00 348/180 |
| 2012/0177111 A1* | 7/2012 | Narroschke | .......... | H04N 19/117 375/E7.243 |
| 2013/0321700 A1* | 12/2013 | Cote | ...................... | H04N 5/213 348/453 |
| 2013/0322753 A1* | 12/2013 | Lim | ........................ | G06T 5/002 382/167 |
| 2014/0037206 A1* | 2/2014 | Newton | ................. | H04N 19/61 382/166 |
| 2014/0044372 A1* | 2/2014 | Mertens | .................. | G06T 9/007 382/248 |
| 2014/0210847 A1* | 7/2014 | Knibbeler | .............. | G11B 20/10 345/589 |
| 2016/0005349 A1* | 1/2016 | Atkins | .................... | G06T 5/007 345/591 |
| 2016/0165256 A1* | 6/2016 | Van Der Vleuten | ........................ | H04N 23/741 375/240.01 |
| 2016/0307368 A1* | 10/2016 | Akeley | ..................... | G06T 9/00 |
| 2016/0366449 A1* | 12/2016 | Stessen | .................. | H04N 19/85 |
| 2017/0330529 A1* | 11/2017 | Van Mourik | ........... | G09G 5/02 |
| 2018/0278985 A1* | 9/2018 | De Haan | ................ | H04N 19/98 |
| 2019/0130542 A1 | 5/2019 | Tichelaar | | |

FOREIGN PATENT DOCUMENTS

| | | | | |
|---|---|---|---|---|
| EP | 2632162 | | 8/2013 | |
| EP | 2880624 B1 | | 10/2015 | |
| EP | 3051821 | | 8/2016 | |
| EP | 3119088 A1 | | 1/2017 | |
| JP | 2017103622 A | | 6/2017 | |
| WO | 2008019524 A1 | | 2/2008 | |
| WO | WO-2008019524 A1 * | | 2/2008 | ............. G06T 5/009 |
| WO | 2013090120 A1 | | 6/2013 | |
| WO | WO-2013090120 A1 * | | 6/2013 | ............. G06T 5/007 |
| WO | 2013127753 A1 | | 9/2013 | |
| WO | 2014056679 A1 | | 4/2014 | |
| WO | 2015007505 A1 | | 1/2015 | |
| WO | 2015072754 A1 | | 5/2015 | |
| WO | 2015124754 A1 | | 8/2015 | |
| WO | WO-2015124754 A1 * | | 8/2015 | ............... H04N 1/64 |
| WO | WO-2016091406 A1 * | | 6/2016 | ............. G06T 5/007 |
| WO | 2016120424 A1 | | 8/2016 | |

OTHER PUBLICATIONS

Cvetkovic, S. et al., "Adaptive tone-mapping transfer functions for high dynamic range video cameras", Consumer Electronics, 2008, Digest of Technical Papers, Piscataway, NJ.

Lauga, P. et al., "Segmentation-based optimized tone mapping for high dynamic range image and video coding", 2013, Picture Coding Symposium.

Edouard, F. et al., "High dynamic range and wide color gamut video coding in HEVC: Status and potential future enhancements", IEEE Transactions on circuits and systems for video technology, vol. 26, No. 1, 2016.

\* cited by examiner

ENCODING AND DECODING HDR VIDEOS

CROSS-REFERENCE TO PRIOR APPLICATIONS

This application a continuation of U.S. application Ser. No. 17/061,937 filed Oct. 2, 2020 which is a continuation of U.S. application Ser. No. 16/085,087 filed Sep. 14, 2018 which claims the benefit of International Application No. PCT/EP2017/056055 filed on Mar. 15, 2017, which claims the benefit of US Provisional Patent Application No. 62/310,233 filed on Mar. 18, 2016 and EP Patent Application No. 16165406.6 filed on Apr. 14, 2016. These applications are hereby incorporated by reference herein.

FIELD OF THE INVENTION

The invention relates to methods and apparatuses for encoding respectively decoding a temporally successive set of high dynamic range images, called herein a HDR video.

BACKGROUND OF THE INVENTION

Until a couple of years ago, all video was encoded according to the so-called low dynamic range (LDR) philosophy, also called standard dynamic range (SDR). That meant, whatever the captured scene was, that the maximum of the code (typically 8 bit luma Y'=255; or 100% voltage for analog display driving) should by standardized definition correspond to, i.e. be rendered on, a display with a peak brightness PB (i.e. the brightest white color it can render) being by standard agreement 100 nit. If people bought an actual display which was a little darker or brighter, it was assumed that the viewer's visual system would adapt so that the image would still look appropriate and even the same as on the reference 100 nit display, rather than e.g. annoyingly too bright (in case one has e.g. a night scene in a horror movie which should have a dark look).

Of course, for practical program making this typically meant maintaining a tight control of the scene lighting setup, since even in perfectly uniform lighting the diffuse reflection percentage of various objects can already give a contrast ratio of 100:1. The black of such a SDR display may typically be 0.1 nit in good circumstances, yet 1 nit or even several nits in worst circumstances, so the SDR display dynamic range (the brightest white divided by the darkest viewable black) would be 1000:1 at best, or worse, which corresponds nicely to such uniform illuminated scenes, and an 8 bit coding for all the required to be rendered pixel grey values or brightnesses, having a gamma of approximately 2.0, or encoding inverse gamma 0.5. Rec. 709 was the typically used SDR video coding. Typically also cameras had problems capturing simultaneously both very bright and rather dark regions, i.e. a scene as seen outside a window or car window would typically be clipped to white (giving red, green and blue additive color components R=G=B=max., corresponding to their square root coded values R'=G'=B'=255). Note that if in this application a dynamic range is specified firstmost with a peak brightness (i.e. the brightest rendered or renderable luminance) only, we assume that the lowest luminance value is pragmatically zero (whereas in practice it may depend on viewing conditions such as display front plate or cinema screen light reflection, e.g. 0.1 nit), and that those further details are irrelevant for the particular explanation. Note also that there are several ways to define a dynamic range, and that the most natural one typically used in the below explanations is a display rendered luminance dynamic range, i.e. the luminance of the brightest color versus the darkest one.

Note also, something which has become clearer during the HDR research, and is mentioned here to make sure everybody understands it, that a code system itself does not natively have a dynamic range, unless one associates a reference display with it, which states that e.g. R'=G'=B'=Y'=255 should correspond with a PB of 100 nit, or alternatively 1000 nit, etc. In particular, contrary to what is usually pre-assumed, the number of bits used for the color components of pixels, like their lumas, is not a good indicator of dynamic range, since e.g. a 10 bit coding system may encode either a HDR video, or an SDR video, determined on the type of encoding, and in particular the electro-optical transfer function EOTF of the reference display associated with the coding, i.e. defining the relationship between the luma codes [0, 1023] and the corresponding luminances of the pixels, as they need to be rendered on a display.

In this text it is assumed that when a HDR image or video is mentioned, it has a corresponding peak brightness or maximum luminance for the highest luma code (or equivalently highest R', G', B' values in case of an RGB coding e.g. rather than an YCbCr encoding) which is higher than the SDR value of 100 nit, typically at least 4× higher, i.e. the to be rendered maximum display luminance for having the HDR image look optimal may be e.g. 1000 nit, 5000 nit, or 10000 nit (note that this should not be confused with the prima facie complex concept which will be detailed below that one can encode such a HDR image or video as a SDR image or video, in which case the image is both renderable on a 100 nit display, but importantly, also contains all information—when having corresponding associated metadata encoding a color transformation for recovering the HDR image—for creating a HDR image with a PB of e.g. 1000 nit!).

So a high dynamic range coding of a high dynamic range image is capable of encoding images with to be rendered luminances of e.g. up to 1000 nit, to be able to display-render good quality HDR, with e.g. bright explosions compared to the surrounding rendered scene, or sparkling shiny metal surfaces, etc.

In practice, there are scenes in the world which can have very high dynamic range (e.g. an indoors capturing with objects as dark as 1 nit, whilst simultaneously seeing through the window outside sunlit objects with luminances above 10,000 nit, giving a 10000:1 dynamic range, which is 10× larger than a 1000:1 DR, and even 100 times larger than a 100:1 dynamic range, and e.g. TV viewing may have a DR of less than 30:1 in some typical situations, e.g. daylight viewing). Since displays are becoming better (a couple of times brighter PB than 100 nit, with 1000 nit currently appearing, and several thousands of nits PB being envisaged), a goal is to be able to render these images beautifully, and although not exactly identical to the original because of such factor like different viewing conditions, at least very natural, or at least pleasing. And this needs what was missing in the SDR video coding era: a good pragmatic HDR video coding technology.

The reader should also understand that because a viewer is typically watching the content in a different situation (e.g. sitting in a weakly lit living room at night, or in a dark home or cinema theatre, instead of actually standing in the captured bright African landscape), there is no identity between the luminances in the scene and those finally rendered on the TV (or other display). This can be handled inter alia by having a human color grader manually decide about the optimal colors on the available coding DR, i.e. of the associated reference display, e.g. by prescribing that the sun in the scene should be rendered in the image at 5000 nit (rather than its actual value of 1 billion nit). Alternatively, automatic algorithms may do such a conversion from e.g. a raw camera capturing to what in the text will be (generically) called a (master) HDR grading. This means one can then render this master grading on a 5000 nit PB HDR display, at those locations where it is available.

At the same time however, there will for the coming years be a large installed base of people having a legacy SDR display of 100 nit PB, or some display which cannot make 5000 nit white, e.g. because it is portable, and those people need to be able to see the HDR movie too. So there needs to be some mechanism to convert from a 5000 nit HDR to a 100 nit SDR look image of the same scene.

FIG. 1 shows a couple of illustrative examples of the many possible HDR scenes a HDR system of the future (e.g. connected to a 1000 nit PB display) may need to be able to correctly handle, i.e. by rendering the appropriate luminances for all objects/pixels in the image. E.g. ImSCN1 is a sunny outdoors image from a western movie, whereas ImSCN2 is a nighttime image. What makes HDR image rendering different from how it always was in the LDR era which ended only a couple of years ago, is that the LDR had such a limited dynamic range (about PB=100 nit, and black level+−0.1 to 1 nit), that mostly only the reflectivities of the objects could be shown (which would fall between 90% for good white and 1% for good black). So one had to show the objects independent of their illumination, and couldn't at the same time faithfully show all the sometimes highly contrasty illuminations of the scene that could happen. In practice that meant that the highly bright sunny scene had to be rendered with approximately the same display luminances (0-100 nit) as a dull rainy day scene. And even the night time scenes could not be rendered too dark, or the viewer would not be able to well-discriminate the darkest parts of the image, so again those night time brightnesses would be rendered spanning the range between 0 and 100 nit. So one had to conventionally color the night scenes blue, so that the viewer would understand he was not looking at a daytime scene. Now of course in real life human vision would also adapt to the available amount of light, but not that much (most people in real life recognize that it's getting dark). So one would like to render the images with all the spectacular local lighting effects that one can artistically design in it, to get much more realistic rendered images at least if one has a HDR display available.

So on the left axis of FIG. 1 are object luminances as one would like to see them in a 5000 nit PB master HDR grading for a 5000 nit PB display. If one wants to convey not just an illusion, but a real sense of the cowboy being in a bright sunlit environment, one must specify and render those pixel luminances sufficiently bright (though also not too bright), around e.g. 500 nit. For the night scene one wants mostly dark luminances, but the main character on the motorcycle should be well-recognizable i.e. not too dark (e.g. around 5 nit), and at the same time there can be pixels of quite high luminance, e.g. of the street lights, e.g. around 3000 nit on a 5000 nit display, or around the peak brightness on any HDR display (e.g. 1000 nit). The third example ImSCN3 shows what is now also possible on HDR displays: one can simultaneously render both very bright and very dark pixels. We see a dark cave, with a small opening through which we see the sunny outside. For this scene one may want to make the sunlit objects like the tree somewhat less bright than in a scene which wants to render the impression of a bright sunny landscape, e.g. around 400 nit, which should be more coordinated with the essentially dark character of the inside of the cave. A color grader may want to optimally coordinate the luminances of all objects, so that nothing looks inappropriately dark or bright and the contrast are good, e.g. the person standing in the dark in this cave may be coded in the master HDR graded image around 0.05 nit (assuming HDR renderings will not only be able to render bright highlights, but also dark regions).

It can be understood that it may not always be a trivial task to map all the object luminances for all these very different types of HDR scene to optimal luminances available in the much smaller SDR or LDR dynamic range (DR_1) shown on the right of FIG. 1, which is why preferably a human color grader may be involved for determining the color transformation (which comprises at least a luminance transformation, or luma transformation when equivalently performed on the luma codes). However, one can always choose to use automatically determined transformations, e.g. based on analyzing the color properties of the image content such as its luminance histogram, and this may e.g. be a preferred option for simpler kinds of HDR video, or applications where human grading is less preferred e.g. as in real-time content production (in this patent it is assumed that without limitation grading could also involve the quick setting of a few color transformation function parameters, e.g. for the whole production quickly prior to the start of capturing).

Applicant has designed a coding system, which not only can handle the communication (encoding) of merely a single standardized HDR video, for a typical single kind of display in the field (with every end viewer having e.g. a 1000 nit PB display), but which can at the same time communicate and handle the videos which have an optimal look for various possible other display types with various other peak brightnesses in the field, in particular the SDR image for a 100 nit PB SDR display.

Encoding only a set of HDR images, i.e. with the correct look i.e. image object luminances for a rendering on say a 1000 nit HDR monitor, in e.g. a 10 bit legacy MPEG or similar video coding technology is not that difficult. One only needs to establish an optimal OETF (opto-electronic transfer function) for the new type of image with considerably larger dynamic range, namely one which doesn't show banding in the many compared to white relatively dark regions, and then calculate the luma codes for all pixel/object luminances.

Applicant however designed a system which is able to communicate HDR images actually as LDR images, i.e. actually LDR (or more precisely SDR, standard dynamic range by which we mean a legacy Rec. 709-based encoding referred to a 100 nit PB reference display, and often optimally color graded on such a reference display) images are communicated, which then can already immediately be used for rendering the correctly looking SDR look on legacy 100 nit PB SDR displays. Thereto, a set of appropriate reversible color transformation functions F_ct is defined, as is illustrated with FIG. 2. These functions may be defined by a human color grader, to get a reasonably looking SDR image (Im_LDR) corresponding to the HDR master image MAST_HDR, whilst at the same time ensuring that by using the inverse functions IF_ct the original master HDR (MAST_HDR) image can be reconstructed with sufficient accuracy as a reconstructed HDR image (Im_RHDR), or, automatic analysis algorithms may be used at the content creation side for determining suitable such color transformation functions F_ct. We will assume unless the teachings need more specific elucidations, that a couple of standard functions are used at the creation side, e.g. a loggamma-shaped initial HDR-to-SDR mapping as in WO2015007505 (e.g. with the specific shape of the function being chosen on how far the lobe of the brightest colors (see lamps) in the HDR image lies from the lobe of the average colors (say e.g. a city view at dusk)), and where useful a further e.g. 3 part curve adjusts at least one of the darkest sub-region of colors, or the middle or the brighter, e.g. without limitation merely for elucidation we assume that a face detector algorithm at the creation side can determine a parameter of that function controlling the dark slope in case there is at least one face in the dark. Or some embodiments we will elucidate with the example wherein already two graded images (for one time instant of the movie or in general video content) are available at the creation side before encoding those two as one image to be communicated according to the present invention principles, with without limitation for understanding we will assume are a HDR image (e.g. with 1000 nit coding peak brightness PB_C, i.e. the brightest white luminance that can be encoded with that color representation of that chosen encoding), and a SDR (100 nit PB_C) image, both graded previously by a human color grader. Note that instead of relying on a receiving side to invert the functions F_ct into IF_ct, one can also send already the needed functions for calculating Im_RHDR from the received and decoded SDR image Im_RLDR. So what the color transformation functions actually do is change the luminances of the pixel in a HDR image (MAST_HDR) into LDR luminances, i.e. the optimal luminance compression as shown in FIG. 1 to fit all luminances in the 100 nit PB LDR dynamic range DR_1. Applicant has invented a method which can keep the chromaticities of the colors constant, effectively changing only their luminances, as will be elucidated below.

A typical coding chain as shown in FIG. 2 works as follows. Some image source 201, which may e.g. be a grading computer giving an optimally graded image, or a camera giving a HDR output image, delivers a master HDR image MAST_HDR, to be color transformed and encoded. A color transformer 202 applies a determined color transformation, e.g. a concave bending function, which for simplicity of elucidation we will assume to be a gamma function with coefficient gam=1/k and k a number larger than 2.0. Of course more complex luminance mapping functions may be employed, provided that they are sufficiently reversible, i.e. the Im_RHDR image has negligible or acceptable banding. By applying these color transformation functions F_ct comprising at least luminance transformation functions, an output image Im_LDR results. This image or set of images is encoded with a legacy LDR image encoder, which may potentially be modified somewhat, e.g. the quantization tables for the DCT-ed transformations of the prediction differences may have been optimized to be better suited for images with HDR characteristics (although the color transformations may typically already make the statistics of the Im_LDR look much more like a typical LDR image than a typical HDR image, which HDR image typically has relatively many pixels with relatively dark luminances, as the upper part of the range may often contain small lamps etc.). E.g., a MPEG-type encoder may be used like HEVC (H265), yielding an encoded SDR image Im_COD. This video encoder 203 then pretends it gets a normal SDR image, although it also gets the functions F_ct which allow the reconstruction of the master HDR image, i.e. effectively making this a dual co-encoding of both an SDR and a HDR look, and their corresponding set of images (Im_RLDR, respectively Im_RHDR). There may be several manners to communicate this metadata comprising all the information of the functions F_ct, e.g. they may be communicated as SEI messages. Then a transmission formatter 204 applies all the necessary transformations to format the data to go over some transmission medium 205 according to some standard, e.g. a satellite or cable or internet transmission, e.g. according to ATSC 3.0, or DVB, or whatever video signal communication principle, i.e. packetization of the data is performed, channel encoding, etc. At any consumer or professional side, a receiver 206, which may be incorporated in various physical apparatuses like e.g. a settopbox, television or computer, undoes the channel encoding by applying unformatting and channel decoding. Then a video decoder 207 applies e.g. HEVC decoding, to yield a decoded LDR image Im_RLDR. Then a color transformer 208 is arranged to transform the SDR image to an image of any non-LDR dynamic range. E.g. the 5000 nit original master image Im_RHDR may be reconstructed by applying the inverse color transformations IF_ct of the color transformations F_ct used at the encoding side to make the Im_LDR from the MAST_HDR. A display tuning unit 209 may be comprised which transforms the SDR image Im_RLDR to a different dynamic range, e.g. Im3000 nit being optimally graded in case display 210 is a 3000 nit PB display, or a 1500 nit or 1000 nit PB image, etc.

FIG. 3 shows how one can design just one exemplary (non limitative) color transform-based encoding of a HDR and SDR image pair, having as particular not always necessary but useful property in this example a chromaticity-preserving luminance re-calculation, the example being taken from WO2014056679. One can understand this processing when seen in the gamut normalized to 1.0 maximum relative luminance for both the SDR and the HDR image (i.e. assuming that the SDR and HDR have the same e.g. Rec. 2020 primaries, they have then exactly the same tent-shaped gamut; as shown in FIG. 1 of WO2014056679). If one were to drive any display with e.g. the cowboy having in the driving image a luma code corresponding to a luminance of 10% of peak brightness of the display, then that cowboy would render brighter the higher the PB of the display is. That may be undesirable, as we may want to render the cowboy with (approximately) the same luminance on all displays, e.g. 60 nit. Then of course his relative luminance (or the corresponding 10 bit luma code) should be lower the higher the PB of the display is, to get the same ultimate rendered luminance. I.e., one could represent such a desire as a downgrading mapping e.g. from luma code 800 for the SDR image, to e.g. luma code 100 for the HDR image (depending on the exact shape of the EOTF defining the codes which is used), or, in luminances one maps the 60% SDR luminance to e.g. $\frac{1}{40}^{th}$ of that for a 4000 nit HDR display or its corresponding optimally graded image. Downgrading in this text means changing the luma codes of the pixels (or their corresponding to be rendered luminances) from a representation of higher peak brightness (i.e. for rendering on a higher PB display, e.g. of 1000 nit PB) to the lumas of an image of the same scene in a lower PB image for rendering on a lower PB display, e.g. a 100 nit SDR display, and upgrading is the opposite color transformation for converting a lower PB image into a higher PB image, and one should not confuse this with the spatial upscaling and downscaling, which is adding new pixels respectively dropping some pixels or some color components of those pixels. One can do that for any color, in which a (RGB) triplet corresponds to some chromaticity (x,y) in the display or encoding code gamut, in a manner which will automatically scale to the maximum luminance available (renderable) for that chromaticity Lmax(x,y), by the apparatus of FIG. 3. Actually, one can demonstrate that this corresponds to applying a similar luminance mapping, which on the achromatic axis (i.e. of colors having no particular hue) which takes the input luminance L of the color in the SDR image, to the needed relative output luminance L* of the optimal HDR graded image. Without diving into details, what is relevant from this teaching, is that the corresponding color transformation can then be realized as a multiplicative transformation on the (preferably linear) RGB components, on each component separately, by a multiplier 311, with a constant g larger or smaller than 1.0, which corresponds to whatever shape of the luminance transformation function L_out=TM(L_in) one choses, which can also be formulated as a functional transformation of the maximum of the input red, green and blue color values of a pixel. So for each input color (R, G, B), the appropriate g-value is calculated for applying the desired color transformation which transforms Im_RLDR into Im_RHDR (or in an appropriately scaled manner into any other graded image, like Im3000 nit), when luminance mapper 307 gets some SDR-luminance to HDR_luminance mapping function, e.g. a parametrically specified loggamma function or sigmoid, or a multilinear curve received as a LUT. The components of the exemplary embodiment circuit are: 305: maximum calculator, outputting the maximum one (maxRGB) of the R, G, and B values of a pixel color being processed; 301: luminance convertor, calculating the luminance of a color according to some color definition standard with which the system currently works, e.g. Rec. 2020; 302: divider, yielding Lmax(x,y) as L/max (R, G, B); 307 luminance mapper actually working as a mapper on maxRGB, yielding m*=TM(maxRGB), with TM some function which defines the luminance transformation part of F_ct; 308: a multiplier, yielding L*=(m*)xLmax(x,y) and 310 a gain determination unit, being in this embodiment actually a divider, calculating g=L*/L, i.e. the output HDR relative luminance divided by the input SDR relative luminance L; and 311 is a multiplier arranged to multiply the three color components R, G, B with the same g factor.

This circuit may be appropriate for some color encodings. However, one would ideally like to work in typical SDR encodings as they are typically used. Im_LDR as it would come out of HEVC decoder 207, would typically be in a non-linear Y'CbCr encoding (wherein we can assume the Rec. 709 non-linearity of the luma Y' to be a square root approximately, i.e. ignoring the non-constant luminance issues then: Y'=sqrt(L) approximately).

FIG. 4 shows a possibility to realize the same intended luminance-changing color processing, as a multiplicative strategy on the Y', Cb and Cr pixel color components directly. Also, instead of communicating a TM( ) function where one still needs to do the division (by respectively according to the selected embodiment case the linear luminance L, or the sqrt input luma Y') to obtain the gain value g for the multiplications, in this case we communicate already the required various g values for the possible luma Y' values of pixels in the image, e.g. as a lookup table g_ct, or any equivalent codification needing less data, as long as the receiving side receives the correct functional transformation specification, to, in this example reconstruct the master HDR image from the received SDR look image of the encoded HDR scene. The skilled reader should understand when we say that the various aspects can be combined interchanged in various embodiments. E.g., there may also be other embodiments which do a scaling of a luminance-independent encoding of the color (e.g. a chromaticity) with a correct final luminance for the present to be calculated pixel color in HDR, i.e. a L_out_HDR.

One can see again in decoder 400 (after upscalers 401, and 402, which are optional in some embodiments, e.g. 4:4:4 codings) a conversion from YCbCr to RGB by color space transformation unit 403, to get (now non-linear, i.e. square root of the linear additive color components; indicated by the prime strokes ') R', G' and B' values, to calculate the maximum one of those three color components by maximum calculation unit 404 (note that some alternative embodiments may used weighted versions, e.g. Wr*R', and other inputs to the maximize, e.g. luma Y' or a reconstructed value or approximation of the luminance L of the pixel color, but we will not explain those details to keep the core concepts sufficiently simple). Gain determination unit 405 will receive from the creation side (e.g. as metadata on a BD-disk, or a communicated video signal, e.g. as SEI messages or a similar mechanism) a specification of the desired gains depending on the pixel color (i.e. the particular image content), namely e.g. g_ct as a LUT, and it is arranged to output the g value for this pixel being processed, to be used by multipliers 409, 410, and 411, to multiply the color components with, e.g. Y'4H being the HDR luma=g*Y'4L, i.e. the input luma of the SDR image which was received, etc. In this example we also show the optional possibility of having a different gain factor gs for the chrominance components Cb, and Cr, in case there are optional upscalers 407, and 408 which will determine those values based on what g value was determined.

We also show for information that a further color transformer 412 can transform that (e.g. internal to the decoding processing core) YCbCr color into another format suitable for a purpose, e.g. R", G" and B" values encoded according to a SMPTE ST.2084 EOTF or code allocation function, e.g. because display 420 to be served with the correctly graded images demands such a format as image color communication format, e.g. over an HDMI connection.

So all these encoder resp. decoder topologies are possible for enabling HDR encoding, communication, and correct decoding. That doesn't mean one has everything one would desire though. Indeed, specifying a good HDR display, e.g. able to render pixel luminances between e.g. 0.01 nit and 1000 nit (or 5000 nit) is a necessity. That doesn't mean one has nicely looking images to show on it. If one considers that to be the problem of the creating artist, one should realize however that we have still the in-between coding technology, and although for a single HDR image encoding any suitable reversibly decodable code allocation would suffice, coding technologies which allow at the same time encoding several dynamic range looks of a HDR scene (i.e. at least two, typically a SDR and HDR, although one could apply the same principles when encoding e.g. two HDR looks, e.g. a 1000 nit HDR version and a 10,000 nit HDR image), have some further practical limitations, which need to be handled with detailed technical care, or they will limit the usefulness of the coding system. More specifically, there may be a trade-off between what the grader can realize, in particular the quality of the look of the SDR image, and the quality of the HDR image, which ideally should (given all practical constraints, like e.g. lack of time of a human grader to fine-tune his look, or reduced complexity of a certain IC not supporting some color functions, etc.) both be of good or at least sufficient quality. But at least one would expect the HDR image to be of good quality, otherwise why bother making a new high quality system. In particular, although HDR can be about significantly higher brightness parts of rendered images, good technical care has to be taken also about the dark regions of the image, and that is a further practical problem we will cater for with the below embodiments.

Rocco Goris et al: "Philips response to Cfe for HDR and WCG, 112, MPEG meeting 23 Jun. 2015/July 2015 Warsaw no. MPEG2015/m36266 describes one of the possible manners developed by applicant to allowed a structured conversion between HDR and SDR gradings of an image, and vice versa, and in particular the functional joint coding and communication thereof. What is not taught however is the differential specific manner to safely treat the deep HDR blacks.

Complex HDR codings have also been proposed, e.g. "Paul Lauga, et al.: Segmentation-based optimized tone mapping for HDR image and video coding; 2013 Picture Coding Symposium IEEE 8 Dec. 2013, pp. 257-260", but they do not translate well to practical already deployed video handling systems (like legacy HEVC encoding), in particular for that teaching because it needs the communication of a bitmap to indicate where pixels are where the decoder has to be particularly careful, because the particular coding trick has been used.

SUMMARY OF THE INVENTION

A very advantageous system of pragmatically encoding HDR scene images as communicated SDR images is obtained by having a HDR video decoder (600, 1100) arranged to calculate a HDR image (Im_RHDR) based on applying to a received 100 nit standard dynamic range image (Im_RLDR) a set of luminance transformation functions, the functions comprising at least a coarse luminance mapping (FC), which is applied by a dynamic range optimizer (603) to a pixel luma of the standard dynamic range image yielding a dynamic range adjusted luma (Y'HPS), and subsequently by a range stretcher (604) a second function which is a mapping of the darkest value (0) of the dynamic range adjusted luma (Y'HPS) onto a received black offset value (Bk_off), the video decoder further comprising a gain limiter (611, 1105) which is arranged to apply, as an alternative calculation to the coarse mapping and the mapping of the darkest value, an alternate luminance transformation function to the pixel luma of the standard dynamic range image which maps onto a sub-range (502) of the darkest luminances of the HDR image corresponding darkest lumas (Y'_in) of the standard dynamic range image. The range stretcher will typically work with a linear mapping in perceptually uniform space (or the corresponding strategy in another color space).

This gain limiter strategy is both useful when having a human color grader who may be somewhat wild in selecting his grading functions to obtain the SDR look corresponding to the HDR image as he desires (warranting good technical properties of the encoding, i.e. sufficient quality reconstructability of the HDR images, e.g. by pushing some of the HDR image into the deep SDR blacks), but also especially for automatic algorithms, which e.g. estimate the function shapes or parameters based on 2 available pre-created gradings, namely HDR images and corresponding SDR look images, or SDR images which are automatically calculated from the HDR images as reasonable SDR images, based on analyzing the HDR image characteristics etc. The grader can see on a reference display what he is doing (e.g. on SDR ref display, and checking with the master HDR image on HDR display), but an automatic algorithm running real-time during television production cannot. The gain limited parallel (de)coding of the darkest HDR scene colors assures good quality of the HDR reconstruction. There is now good control over the whole range of the SDR lumas, both regarding the needs of artistic aspects of the SDR look, and the quality of reconstruction of the HDR input image communicated as a corresponding SDR image, and the system is simple, conforming to what one would expect for a SDR image, also regarding the further processing (e.g. MPEG encoding/decoding) in already deployed video communication systems, without needing exotic tricks, and further coding beyond the luminance mapping function(s). In case the first luminance mapping of our parallel strategy calculation is good, it will be selected, as it will typically contain the desired grading by e.g. a human grader at the creation side, but otherwise, if it is worse than minimally required for HDR reconstruction by decoders at a receiving side, the gain limiting strategy will be selected, which will be designed to be at least good enough for the minimal quality level needed from HDR reconstruction perspective.

The following variants and embodiments are also advantageous.

A HDR video decoder (600) wherein the gain limiter is arranged to calculate a minimum of an intermediate HDR luminance (L_HDR_IM) obtained by applying the set of luminance transformation functions, and a function of the input luma (Y'_in). It is advantageous for encoders and decoders if the needed strategy is realized by a simple calculation.

A HDR video decoder (600) in which the alternate luminance transformation is defined as a multiplication of a prefixed or received constant (1/gP) by the values of a perceptualized luma (Y'P), which perceptualized luma (Y'P) is calculated by applying a non-linear function to the input lumas, which non-linear function is characterized in that a set of perceptualized luma values at equidistant positions from each other has a visually uniform brightness appearance. The embodiment in the perceptualized color space has been found to work great.

A HDR video decoder (600) wherein the non-linear function has a definition of $Y'P=\log[(1+(rho-1)*power(L\_SDR\_in,1/2,4)]/\log(rho)$, in which L_SDR_in are linear luminances of the standard dynamic range image (Im_RLDR), and wherein rho is a prefixed or communicated constant.

A HDR video decoder (600) wherein the constant (1/gP) is determined by the HDR video decoder as a function of a received value of a coding peak brightness (PB_C) of the HDR image.

A HDR video decoder (600) comprising a processor (901) to control the selecting of either the alternative luminance transformation, or a transformation on the basis of the set of luminance transformation functions for at least the darkest luminances of the standard dynamic range image (Im_RLDR), wherein the set of luminance transformation functions comprises a fine grading function which comprises specification of the transformation for the darkest HDR luminances into the darkest luminances of the standard dynamic range image (Im_RLDR).

A HDR video decoder (600) wherein that processor (901) is arranged to determine which luminance transformation to apply based on the checking of whether the received value of a black offset (Bk_off) is zero or not.

Embodiments with more possibilities, although more complex, allow even better and more attuned handling for complex HDR scenarios or requirements.

A HDR video encoder arranged to calculate a 100 nit standard dynamic range image (Im_RLDR) representation of an input HDR image (Im_RHDR), the video encoder comprising:
- a range stretcher (702) arranged to map a value of an input HDR luminance or luma (Y'HP) to a minimum black value, the minimum black value typically being zero;
- a dynamic range optimizer (703) arranged to apply a coarse luminance mapping (FC), such as a function which specifies the allocation of two luminance sub-regions of the HDR image to two sub-regions of the range of the resultant lumas (Y'R);
- a gain limiter (707) arranged to apply an alternate luminance transformation function to transform a subset (502) of the darkest luminances of the HDR image into corresponding darkest lumas (Y'_in) of the standard dynamic range image.

A HDR video encoder arranged to calculate a 100 nit standard dynamic range image (Im_RLDR) representation of an input HDR image (Im_RHDR), the video encoder comprising:
- a range stretcher (702) arranged to map a value of an input HDR luminance or luma (Y'HP) to a minimum black value, the minimum black value typically being zero, yielding as output a stretched color representation luminance or luma (Y'HPS);
- a dynamic range optimizer (703) arranged to apply a coarse luminance mapping to the stretched color representation luminance or luma (Y'HPS), which specifies the allocation of a dark and bright luminance sub-region of the HDR image to a corresponding dark respectively bright sub-region of the range of the resultant lumas (Y'R);
- a gain limiter (707) arranged to apply as an alternative calculation on the luminances or lumas of the input HDR image an alternate luminance transformation function to transform a subset (502) of the darkest luminances of the HDR image into a range of corresponding darkest lumas (Y'_in) of the standard dynamic range image.

A HDR video encoder as above, in which the alternate luminance transformation is defined as a multiplication of a prefixed or received constant (gP) by the values of a perceptualized luma (Y'HP), which perceptualized luma (Y'HP) is calculated by applying a non-linear function to the HDR input luminance (L_in) which non-linear function is characterized in that a set of perceptualized luma values at equidistant positions from each other has a visually uniform brightness appearance, and wherein the gain limiter (1204) calculates a maximum value of the perceptualized luma multiplied by the prefixed or received constant (gP), and the value of a perceptual luma (Y'P) resulting from successively applying to the perceptualized luma (Y'HP) a range stretching by the range stretcher and a coarse luminance mapping by the dynamic range optimizer.

A method of HDR video decoding arranged to calculate a HDR image (Im_RHDR) based on applying to a received 100 nit standard dynamic range image (Im_RLDR) a set of luminance transformation functions, the functions comprising at least a coarse luminance mapping (FC), and the method comprising:
- applying the coarse luminance mapping (FC) to input luminances (L_SDR_in) or functions thereof being input lumas (Y'P), yielding dynamic range adjusted lumas (Y'HPS);
- applying a gain limiting strategy, by determining an alternate luminance transformation function alternative to the luminance transformation comprising the coarse mapping to calculate luminances falling in a subset (502) of the darkest luminances of the HDR image from corresponding darkest lumas (Y'_in) of the standard dynamic range image, and selecting the lowest one of the alternate luminance transformation function-determined luma (Y'PFB), and the luma (Y'HP) obtained by applying at least the coarse luminance mapping.

A method of HDR video decoding as claimed in claim 10, in which the determining an alternate luminance transformation function comprises determining a linear function over at least the darkest input lumas (Y'_in) of the standard dynamic range image being defined in a perceptual uniform space, as calculated by multiplying a prefixed or received constant (1/gP) by the values of perceptual lumas (Y'P) corresponding to the respective input lumas (Y'_in).

A method of HDR video encoding to calculate a 100 nit standard dynamic range image (Im_RLDR) representation of an input HDR image (Im_RHDR), the method comprising:
- applying a mapping which maps a value of an input HDR luminance or luma (Y'HP) to a minimum black value of a range adjusted luma (Y'HPS) being output of the mapping, the minimum black value typically being zero;
- subsequently applying to the range adjusted luma (Y'HPS) a coarse luminance mapping (FC), which specifies the allocation of a luminance sub-range of the brightest respectively the darkest luminances of the HDR image to respective corresponding brightest and darkest sub-ranges of the range of the resultant lumas (Y'R);
- as an alternative luminance transformation to the combination of the mapping and the coarse luminance mapping applying a gain limiting strategy arranged to apply an alternate luminance transformation function to transform a sub-range (502) of the darkest luminances of the HDR image into corresponding darkest lumas (Y'_in) of the standard dynamic range image.

A method of HDR video encoding as claimed in claim 12, in which the gain limiting calculates the alternate luminance transformation function by multiplying by a factor (gP) a perceptually uniformized luma (Y'HP), obtained by applying a perceptualization function to a luminance (L_in) of the input HDR image (Im_RHDR).

The present new technical ideas may be embodied in various forms, such as connected systems, partial services on remote locations which may be communicated over generic or dedicated networks, a computer program product comprising code which when run on a processor enables the processor to perform all methods steps of one of the above method claims, any video signal codification comprising the various needed metadata which needs to be coordinately communicated between encoder/transmitter and decoder/receiver, etc.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, but hidden in the interior of an object, or for intangible things such as e.g. selections of objects/regions (and how they may be shown on a display).

In the drawings.

DETAILED DESCRIPTION OF THE EMBODIMENTS

Figure 5:
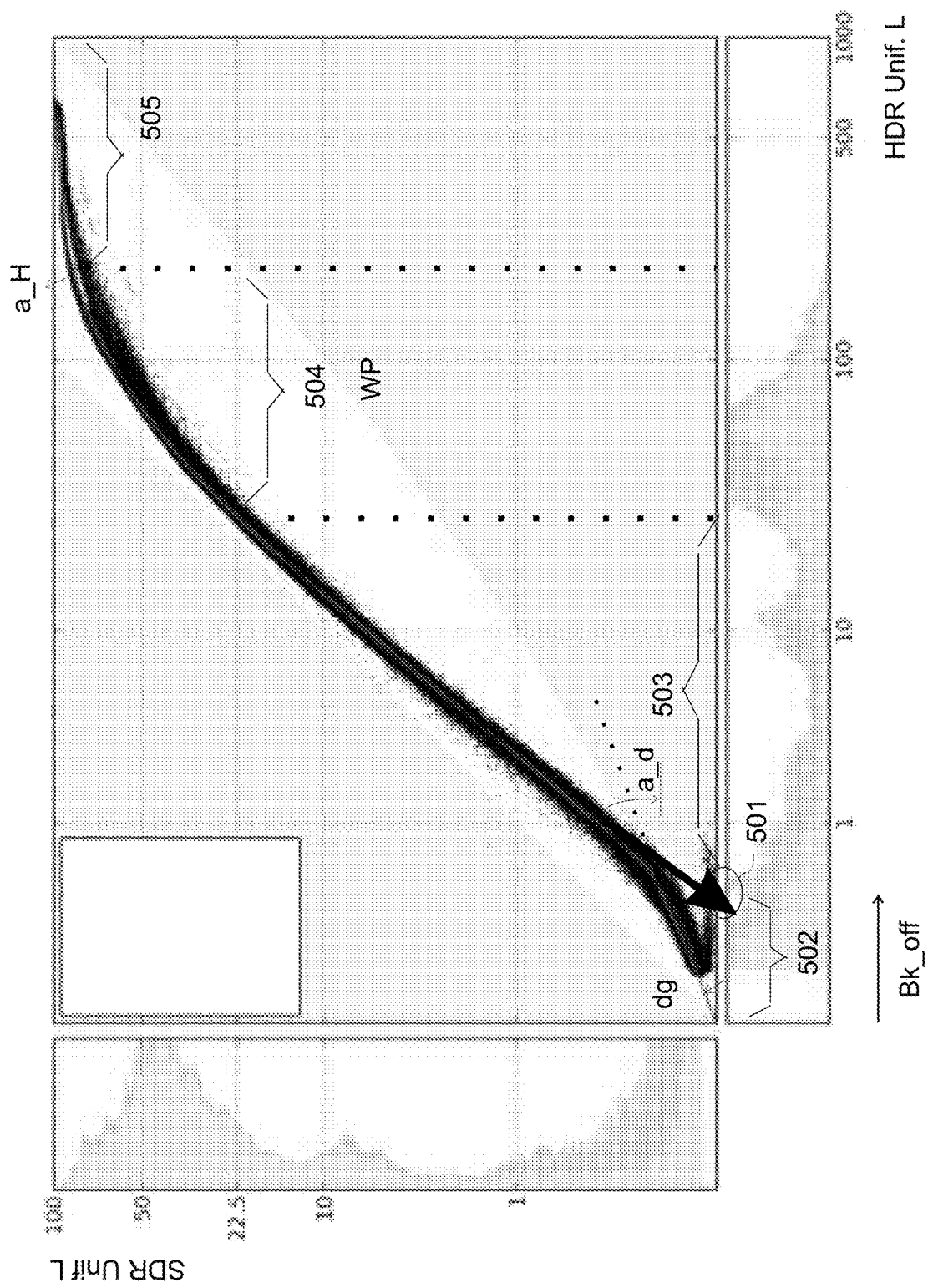
FIG. 5 schematically shows how e.g. an automatic algorithm can match image-dependently to the image statistics a three-part luminance transformation curve as an exemplary member of the tool set of standard re-grading based image coding functions as we pragmatically designed them for HDR video coding, the parameters codifying the shape of this function being communicated to a receiver, so that it can reconstruct and apply the function.

FIG. 5 shows an example of how one can typically model the transformation between the SDR image and the HDR image with curves, luminance (or luma) mapping curves. I.e. also when receiving a SDR image, being able to reconstruct the creation-side master HDR image approximately by applying the inverse curve. There may in some embodiments be various color transformations involved to calculate a region of pixels (e.g. corresponding to an object) in the secondary re-graded image (i.e. in our elucidation a HDR image, of PB_C=1000 nit, just as an example to be clear) on the basis of the geometrically corresponding pixels in the primary image, the SDR PB_C=100 nit image. E.g. local color transformations may be applied only to some regions and not to the rest of the image. However, for practical reasons, in many scenarios one wants simple transformations (usually on global, i.e. dependent on the pixel luma, and not its geometrical location in the image or other such non-color related properties), whether for reasons of the complexity of an IC in a particular embodiment system which needs to be cheap, or the time available for human grading involvement, etc. Typically one wants to start with a convex shape (as we can see the major part of this curve between 1 and 1000 nit on the input x-axis is "small character r-shaped") as we see in FIG. 5, and for some content that may already be sufficiently modeled. The reconstruction of the HDR image is nearly perfect, but for quantization and DCT errors, if one allows the selection of only reversible luminance mapping functions. The quality of the SDR image as we send it to receivers (so formed that it can serve for reconstruction optimally the original master HDR image) may deviate somewhat from the intended (artistic) SDR look image, but for several applications that may suffice (e.g., for a news show, it is not critical that every shadow on the wall behind the news reader has in every pixel exactly the correct grey value, as long as the major image object are of sufficient quality, like e.g. the face of the news reader, etc.; in other words, the artistic and corresponding technical precision demands are relaxed). We will assume for our elucidation that we are automatically encoding an SDR representative image to be communicated, on the basis of two prior existing gradings, namely a PB_C=1000 nit master HDR graded image, and its corresponding optimally looking SDR image. I.e., an image analysis algorithm rather than a human determines the function shape of the HDR-to-SDR luminance transformation (or vice versa). By artistically optimally looking, we mean that all image objects have been given the appropriate luminances in the now 10× smaller luminance dynamic range (0-PB_C_SDR=100 nit instead of 0-PB_CHDR=1000 nit) than for the master HDR image, so that as a look approximating the HDR master look, all objects still look reasonably bright, and the inter-region and intra-object contrasts look appropriate. If one we to use just a linear compression function corresponding to e.g. re-using the HDR relative luminances rescaled to PB_C_SDR=100 nit, the darker regions of the image would be uncomfortably dark. This optimal luminance mapping will depend in general on the type of scene and its various dynamic range look images (e.g. also a MDR image with PB_C_MDR=500 nit), as e.g. the readability of a white commercial logo engraved on glass somewhere in the image may be an object to be represented in a good quality in all DR looks to fulfill obligations to a commercial sponsor of that movie and owner of that logo. So we will assume now, without loss of generality regarding less critical and more automatic embodiments, that a human color grader has taken sufficient time to accurately grade the master HDR and a derived (optimally looking corresponding) SDR image.

Now the encoding of that pair of graded images, can then be done either automatically, or with some involvement of the grader. To make things simple, we will only explain the example of an automatic coding system, but again that should not be seen as a limitation of our invention, since when a human grader is involved in the creation of the SDR-image for the color transformation-based encoding of the HDR/SDR pair (i.e. in which only one of the graded images is actually communicated as a matrix of pixel colors, together with in metadata the functions to re-calculate the other graded image), similar technical principles will apply when he is selecting sequentially from a limited set of base functions (i.e. first making a rough SDR grading by using one simple "r-shaped" function, and then fine-tuning the needed transformation further if he still finds that necessary, also in view of his time and budget to process the movie, as is elucidated i.a. with the processing chain of FIG. 7). Without loss of generality, we will explain the principles with the example where the automatic luminance transformation function determination (based on comparing the histogram of the SDR versus the HDR image, in a kind of "logarithmic" domain, which is determined by a perceptual brightness space transformation developed by applicant for this HDR processing, see below) is of the following type.

We found it is very useful, as you can see also by the fit to the data in the pseudo-logarithmic perceptual space plot (see scales of x and y axis of FIG. 5, which the reader may consider as providing positions which when equidistant look perceptually approximately of a same difference, i.e. grey one, grey_2=20% lighter grey, grey_3=20% lighter than grey_2, etc.), if a grader or automatic optimal matching curve calculation unit uses a three-part curve for at least the initial determination of a SDR image corresponding to the master HDR image as input, which is defined by an angle a_H of a linear sloping part for the bright or highlight pixels in the image (region 505), and an angle a_d for a linear approximation (at least for the rough determination of the SDR re-graded image on the basis of the master HDR image) of the mapping for the darker colors (region 503). This curve only needs three very useful and much-conveying about the image parameters, because as a third part of the curve we use a curved segment, which lies equally stretched over a width WP on both sides of the point where the two line segments cross (i.e. only a_d, a_H and WP need to be communicated to a receiver, which is important for systems which can't afford too much metadata communication, or, graders which can't afford spending too much time on the grading of at least some shots of consecutive images, etc.).

The fixed shape curve of the curved part connecting the two linear parts on either end we use is typically a parabola segment (region 504).

Now there is an interesting property of determining SDR graded images, which can be verified experimentally. An SDR look image of many HDR scenes doesn't look qualitatively very good, if there is not a sufficient amount of dark pixels, i.e. SDR blacks (with a Rec. 709 curve, the lowest codes, e.g. 0, 1 and 2 in 10 bit luma coding, correspond to display rendered luminances of approximately $\frac{1}{1000}^{th}$ of the peak brightness, i.e. $\frac{1}{1000}^{th}$ of 100 nit, and this corresponds to some of the image objects or regions of the HDR scene). So one would expect one would need to continue the function (in our example the linear part for the dark object pixels of the three part curve, but similarly in embodiments that use other functions to determine the SDR graded image) up to approximately 0.1 nit, as seen by the arrow in FIG. 5 (as contrasting with a grading with higher SDR luminances for those objects, which would look inappropriately). That would give a nicely looking SDR image version of those HDR scenes. However, HDR scenes of course have the property that they contain pixel luminances in potentially a very large dynamic range (deep blacks). The reader should carefully note that we are talking about relative luminances compared to the peak brightness of the typical reference display for which the code is intended, or in fact PB_C (in fact this has to do with that, although we prefer to work with absolute encodings of the luminances, in any good looking dynamic range grading, those luminances are referred to some typical display capability, e.g. a 1000 nit display watched in a dim evening living room and not the original scene; to say it in simple terms: the sun will be coded and rendered at 1000 nit, rather than its actual value of 1 billion nit). So a typical HDR scene of say a night scene may have in the real world e.g. luminances in dark corners which are far below 1 nit (e.g. 0.01 nit, or even less), whilst at the same time a street light may be in the image, with luminances of 10,000 nit or more, i.e. a dynamic range of 1,000,000:1 or more, which is by its very nature just not renderable or representable in a SDR representation. Note that in the optimal (master) HDR and SDR grading, the contrast may be somewhat less, as the artist grader may have brightened the darkest parts of the scene somewhat, and darkened the brightest pixels, but one may still desire a nice representation (coding per se, for all uses) and its rendering of that exemplary HDR scene between e.g. 0.05 nit and 5000 nit (whenever such a display is available), i.e. still a display-rendered desired DR of 100,000:1, which is clearly above the SDR capabilities, and that is why we have introduced HDR technology in the first place of course.

So, if one cannot render (or even encode, with Rec. 709-based technology) in the SDR grading anything below the HDR luminance point 501, this means that all HDR values of region 502 in the SDR representation thereof will be clipped to the same black (e.g. luma code 0, whether in 8, 10, or 12 bits representation). That would not really be a problem for systems which communicate HDR images only to the receivers (i.e. which would use the function at the receiving side only to calculate a SDR grading from a received HDR pixellized image), i.e. which can directly render that perfectly encoded image data on a 1000 nit HDR display (e.g. if it is encoded using the SMPTE 2084 OETF), and which would only need the color transformation functions to derive optimal gradings for viewers having displays with display peak brightnesses PB_D lower than 1000 nit. E.g. one could make a SDR grading by using these clipping functions to downgrade from the received HDR images, which would indeed yield the correct optimal SDR look.

But systems encoding two different dynamic range looks of the HDR scene (i.e. two different gradings), e.g. systems which need to communicate SDR images to enable e.g. a large installed base of viewers to see the SDR images when being rendered directly without luminance processing with good quality, and which derive therefrom a very good quality HDR image reconstruction for those customers who have bought a HDR display, have much more constraints. If one clips some of the darker HDR colors in the SDR image to be communicated, one cannot reversibly reconstruct the needed HDR pixel colors at the receiving side.

One may think that the solution might then be that it would be wiser to choose the linear segment for the black in such a manner that it approaches and approximates the locus of points of the corresponding luminances in the SDR versus HDR image (the thicker cloud of points in the r-shape), but then the quality of the SDR look severely deteriorates. When e.g. approaching that cloud with a linear segment for the blacks starting out from (0,0), then many of the darker regions become too bright, and that doesn't look nicely contrasty anymore (people who should be a silhouette against a bright background e.g. become lighter dark grey silhouettes). Where that would give already lesser quality for normal LDR scenes (i.e. e.g. a studio set with object reflectancies between 1% and 95% under carefully uniformized lighting), especially for HDR scenes one would like to see also in the SDR variant of the scene a sufficiently impressive inter-region contrast. SDR representation of HDR scenes can be quite critical and complex, because at the same time one may want to convey that a dark area of a cave is quite somewhat darker than the average lit regions, e.g. near the cave entrance, yet instead of simply making these dark regions very dark, one may also desire to see e.g. a person standing there still somewhat well. Problematically the problem oftentimes even extends into the brighter regions (as course re-grading luminance transformation curves like e.g. a three-part curve due to their simplicity extend any parametric deviation over a large luminance sub-range), which has a severe impact on several local contrasts in the SDR image which should be carefully controlled, e.g. light beams scattering on dust, which may have been carefully chosen by the director for the look of the scene, might almost disappear in the washed-out look that results if one doesn't use the strategy where the lower part of the luminance mapping curve bends towards a good HDR luminance clipping point 501, but rather the absolute zero punt HDR_luminance=0.

So for this problem an additional component is needed (in the grading or at least the coding), and especially one which can easily handle this in all practical scenarios (one only has a really good HDR coding and handling technology, if it is not a different species for various applications, but when a single system can, potentially after some fine-tuned configuration, handle the various needs of applications ranging from high quality offline grading for movies from e.g. Hollywood, up to very cheap on-the-fly television broadcasts, where not too much change is requested, e.g. not too much additional human expert involvement beyond the television production processes as they currently exist, and people have been specialized for, etc.; anyway, in all cases one only has a really good HDR handling system, if one masters the creation, communication and use of both the master HDR grading, and the corresponding SDR grading).

Figure 6:
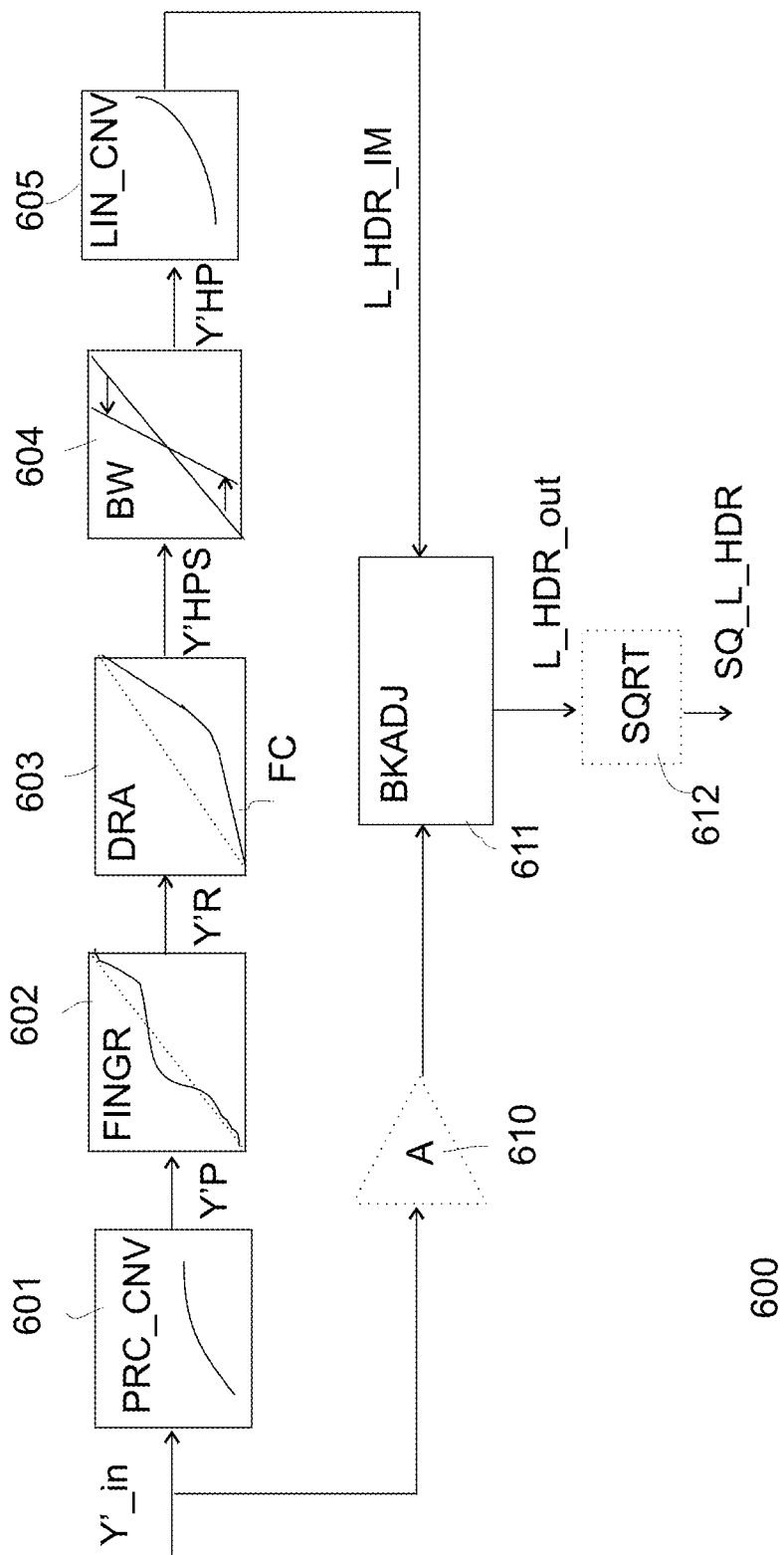
FIG. 6 schematically shows a first basic embodiment of the core of our HDR video decoder according to the present invention principles.

FIG. 6 shows the core luminance transformation part of a decoder (based on and building further on concepts as recently invented by applicant's inventors) having the correct handling of the darkest HDR colors, as it can be incorporated in various embodiments of the decoder embodiments explained with the previous figures.

The input is a classical Rec. 709 luma Y'_in (i.e. e.g. 0-1023 values). A perceptual space conversion unit 601 converts those luminances in a perceptual space (as already introduced with FIG. 5). It may be useful for the reader to keep in mind that if one has a RGB color space, say Rec. 2020, or a derivation thereof like its Y'CbCr variant, then the gamut of all representable colors is a triangular tent with a pointy tip, which can be normalized to 1.0, and the color transformations can then be seen as changings of the positions of the color points inside that tent (HDR relative luminances or lumas falling on different heights than their corresponding SDR luminances or lumas).

E.g., also changing to a perceptual representation changes the heights of the various colors (i.e. their "brightness" as represented in various units), since e.g. redefining the metric on the luminance axis (the vertical pole of the tent through white) to become logarithmic, means that the height of a color having a relative luminance of e.g. 90% should change to the position of wherever that position falls on the logarithmic axis.

We change to a logarithmic representation because it has various advantages for handling SDR re-grading of HDR scene images. Firstly, this uniformization of the luminances in a more perceptual manner, means that one already has a somewhat reasonable very coarse lesser dynamic range representation of the HDR image. However, if one cares artistically, e.g. in a scene which need a nightly darkness to have the right mode, if one were to use that logarithmic image to directly render it on an LDR display, the nightly scene may look incorrect as it may be too bright, and there is no easy saying on how it may look on any HDR display with particular display peak brightness PB_D, but it would be expectable that at least for critical HDR scenes such a simplistic handling would not look optimal on any display. In a normalized color gamut and its luminance axis, HDR images may typically have bright objects near the maximum (1.0), and then the rest of the pixel luminances fall far below this. To squeeze this large dynamic range into an SDR luminance range, those two luminances must come closer together, since the lamps can be only e.g. 2× brighter than the average pixel luminance 512=18% (instead of e.g. 10,000:500=20× in HDR). This can already be approximately achieved by a function which is approximately a logarithm, or some better function similar to it in shape (which in fact does "some" boosting).

But those SDR gradings are not very suitable yet to serve as good quality SDR gradings of the HDR image, as they will look very dull, contrastless, and often washed-out. For good grading one has to take good care of what has to happen to at least one and typically both of a determinable range of the brightest pixels in the scene, and a sub-range of the darkest luminances. Even the simplest versions can then somewhat leave in the middle what happens in the middle range, e.g. just use smooth connecting behavior, or systems could do more precise control there (but for that we have in our codec topology the fine grading function typically).

Philips has invented a function to do the transformation from linear luminances, to perceptual lumas Y'P:

$$Y'P = \log[(1+(rho-1)*power(L,1/2,4)]/\log(rho) \quad [\text{EQ. 1}]$$

in which L is the normalized luminance, and rho is a constant which depends on the PB_C of the HDR image, and which is for 10,000 nit typically 33. The inverse function can be used as linearization function, i.e. to convert from the perceptually uniform luma domain to the linear domain, i.e. of luminances. So our embodiments can work with any luminance perceptual uniformization curve in that perceptual space conversion unit, which creates luma codes which are perceptually more equidistantly spread than luminances, and in particular knowing that the input image was a HDR image, with a considerable dynamic range needed to be represented by equidistant brightness values (which we can technically call lumas in the present application; in the SDR coding era, since there was only a single way to code luminances, the lumas were calculated by the Rec. 709 OETF, which is approximately a square root, but for HDR luma codes can be defined by any applied HDR OETF, which is a function which is steeper than the square root near the blacks, e.g. a SMPTE 2084 PQ function), but for simplicity of elucidation we will assume it's the above Philips function (the rho-parametrized loggamma function of Eq. 1, where rho can be taken fixed or variable; typically it will be fixed if the encoder and decoder work with a fixed pre-agreed max. PB_C for all communicated video content, e.g. 1000 nit, and variable if encodings with different PB_C are used).

In this embodiment however a SQRT Y' luma as input is transformed into the perceptual luma, hence the transform function shape of perceptual space conversion unit 601 will be adjusted for that (one can combine two partial functions, equating to first squaring the Y', and then applying the above Philips perceptualization function shape).

From here on the processing is in perceptual space (as the axes of FIG. 5), and the real content-dependent image/scene-dependent object re-brightening can start. As the reader can see, simple embodiments of functional HDR encoding may have only three blocks (and some cheap encodings don't even use all those).

The three processing blocks (fine grading unit 602, dynamic range optimizer 603, and range stretcher 604) are in the reverse order of what happened in the encoder (but not the perceptualization of unit 601, and the linearization of linearizer 605, as both the encoding and the inverse decoding luminance transform work in the perceptualized pseudo-logarithmic domain, which transformation is always done in the same manner).

Figure 7:
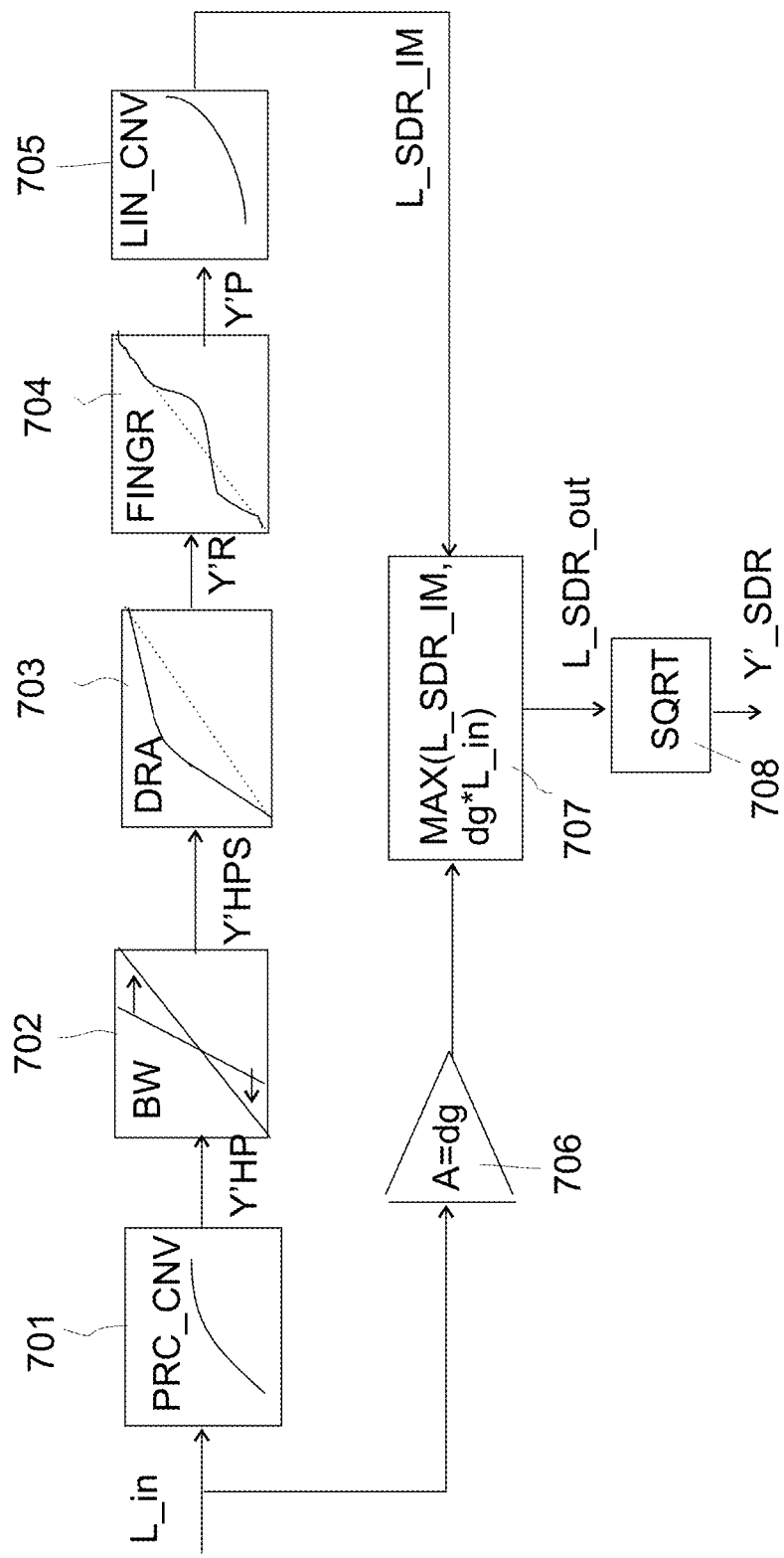
FIG. 7 schematically shows a first possible embodiment of a corresponding encoder.

So it's easier for the reader to start the explanation with the encoder of FIG. 7, as we can then reason from what a human grader (or automatic system emulating this) would like to do when creating an SDR look from the master HDR look. Perceptual space conversion unit 701 is similar to unit 601, only know the conversion starts from linear HDR luminances (without loss of generality with this mere example, some other encoders could also start from other color characterizations for the HDR image, but those are unnecessary details for understanding the present technical concepts). I.e. the unit 701 applies eq. 1. So the output color luminances are now represented as perceptual lumas Y'HP. A luma stretcher 702 stretches the content to the maximum range in SDR. That is an important re-grading step for many embodiments, because having only a small SDR dynamic range, one certainly doesn't want to have unused codes whilst having to render a reasonable SDR representative of what essentially was a HDR scene image. So if we have a movie or scene with luminances only up to e.g. 70% of the maximum, the stretcher may typically map that value to 100% (or at least close to that, e.g. 95%). Similarly a mapping on the dark end may happen, to Y'HPS=0. The reader should note that some scenes and their HDR images may be of considerably large dynamic range, yet, not the highest possible dynamic range encodable. E.g., if the master HDR is in a 10,000 nit PB_C representation, one should be careful allocating pixels to those highest luminances around 10,000 nit, or people may complain that the image is too bright (i.e. in its typical viewing environment it looks unnaturally bright compared to how such a scene would in real life, or it just looks unpleasantly bright). E.g. a small street light could have pixels of 10,000 nit, but the brightest pixel seen through a window from an indoors environment may be only e.g. 1500 nit, which means that for that image the codes between 1500 nit and 10,000 nit are unused. The luma stretcher 702 will then map this 1500 nit brightest color in the image to the maximum of the intermediate color representation Y'HPS, the stretched color representation (which one can see as the maximum of the SDR image, as one can from then on focus on correcting the distribution of object luminances below a fixed white=1.0). Some embodiments may deviate from that, and e.g. map to 90% of the second image dynamic range, e.g. if we use the same technology for HDR1-to-HDR2 re-gradings. Of course the metadata needs to send the 1500 nit point that was originally stretched, so that at the decoding side a range stretcher 604 can map this SDR peak brightness (1.0 corresponding to 1023) back to 1500 nit in the HDR reconstruction.

Also at the black side such a stretching may happen, but in some embodiments one should be careful as blacks behave differently than brights (regarding content semantics, viewing environment, psychovisual appearance, etc.). One could also remove this black stretch processing step, and just handle the allocation of the luminance transformation of all the darkest luminances of the HDR image to the SDR image via a luminance transformation function shape.

In general there can be a couple of modes. For the professional mode, wherein a grader is looking at the graded images resulting from his choices for the parameters of the luminance transformation curves (e.g. he may use a dial to lower or increase the angle of the bright luminances a_H of the three-part curve of unit 703, etc.), not just the SDR image, but also the HDR reconstruction on a HDR reference monitor, so that he can see what the impact of his choices on reconstruction quality is, one can expect that the selection of this curve (in particular the fine grading curve of unit 704 to be discussed below) is leading. Some grading apparatus embodiments in which the encoder is comprised, may offer a warning in case the grader makes a really low slope for the linear approximation of his curve at the darkest HDR values around 0 (which will result in a high slope for the reconstruction and coding errors, like banding or DCT errors), and then the apparatus could upon agreement of the grader propose its own partial curve for the darkest HDR colors, and send that to receivers in the metadata. Automatic grading systems (e.g. coding from a pre-graded master HDR and corresponding master SDR graded image(s)) may need a more secure and coarse approach, e.g. several automatic systems may only have the (e.g. three-segment curve based) coarse determination of the luminance transformation to relate the two gradings (of unit 703), and no fine-tuning curve (of unit 704), in which case a simple scenario for the determination of that bottom part of the luminance mapping curve (which then serves mostly as code allocation curve for the reconstruction of the HDR image rather than an SDR grading curve choice) is desirable. Note that those automatic systems will also typically have the black offset behavior though, e.g. by curve matching on the luminance distribution statistics as shown in FIG. 5.

For simplicity of understanding, we assume that coarse SDR grading determination unit 703 applies the above-mentioned image-optimized content curve, e.g. by automatic estimation based on the histogram data as in FIG. 5 (or equivalently this could be based on human grader optimization). In general, if a human is involved, the coarse grading may use a coarse redistribution of the darkest pixels versus the brightest pixels, i.e. the luminance sub-ranges they span in respectively the HDR versus the SDR luminance subrange. So typically a curve like the three-part curve shown will be involved, which controls at least the luminance spans of the brighter and darker parts of the scene. The reader may understand a typical usage scenario and behavior e.g. from the inter-regional contrast control of a night scene with a shop window. Let's say that in the shop some mannequins with clothes are brightly lit, or even the shop may sell lit lamps, and outside, in the dark, there may be other objects, like e.g. the tiles of the pavewalk. With the coarse controls the grader can optimize such visual aspects like the visibility of the objects in the dark region of the image, like the tiles of the outside pavewalk, and he can control how nicely brightly shine the lamps in the lit shop window are, etc. The reader from his knowledge of mathematics can understand how an automatic luminance mapping function determination unit can determine a coarse grading function, if the luminance distribution of the pixel luminances in the SDR and HDR master gradings show such a "r-shape" behavior as in FIG. 5 (and he can also understand the optimal curve matching if the luminance distribution cloud shape is somewhat different, and why this is then a coarse luminance mapping, which does already behave reasonable when calculating a SDR grading to be encoded and communicated corresponding to the master HDR image, although it is not as perfect as a function which with the fine-tuning optimizable curve approximates the relationship between the SDR and HDR gradings of the particular HDR scene, and its colorimetric re-grading needs, better).

Then for some embodiments, mostly those which require high color quality grading involving human graders—but also some automatic systems could determine such a fine-tuning curve e.g. based on identifying a region of the input HDR luma range for which the mapped 3-part curve deviates too much from the e.g. locus of middle points per input HDR luma of the cloud of (luminance_SDR, luminance_HDR) points (which would determine a free-from curve rather than a 3 point one)—a fine-grading curve can be determined. This curve is applied to the rough lumas Y'R of each pixel being processed by fine grading unit 704 (after having been processed by the coarse mapping). When this fine grading luma mapping curve oscillates around the diagonal, the net result is that in the final SDR output image some subsets of pixels with particular brightnesses will be SDR-graded brighter or darker than the rough SDR lumas Y'R, namely with precise lumas Y'P (the output of unit 704). This curve can fulfill several artistic requirements, e.g. creating a higher contrasts for some midrange luminance objects, but we will below see how it can be elegantly used to prescribe good SDR looks for the darkest regions whilst retaining good HDR reconstruction quality.

Figure 1:
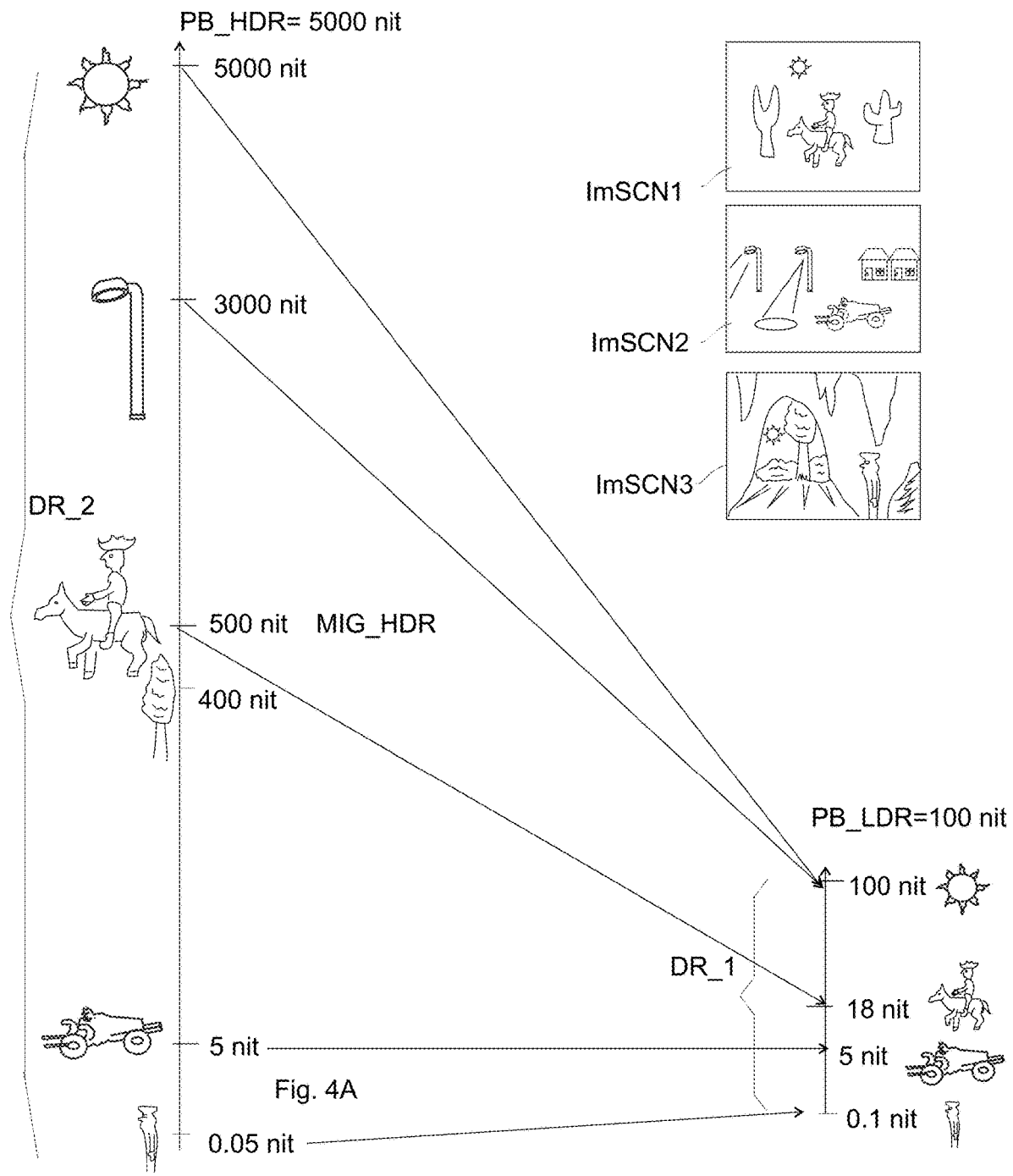
FIG. 1 schematically illustrates a number of typical color transformations which occur when one optimally maps a high dynamic range image to a corresponding optimally color graded similarly looking (as similar as desired and feasible given the differences in the first and second dynamic ranges DR_1 resp. DR_2), which in case of reversibility would also correspond to a mapping of an LDR image of the HDR scene, to a HDR image of that scene.
Figure 2:
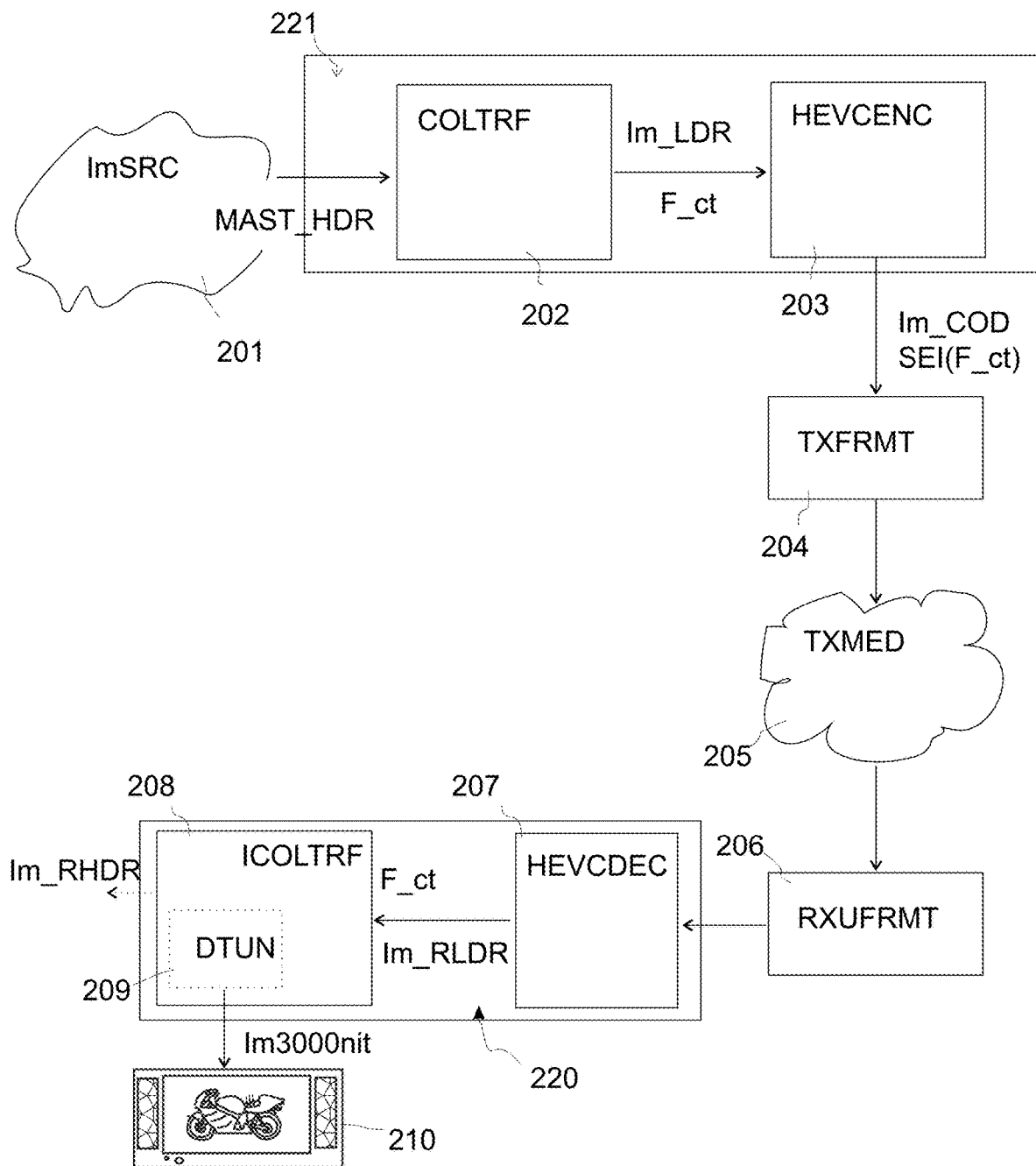
FIG. 2 schematically illustrates a technology to encode high dynamic range images, i.e. images capable of having luminances of at least 700 nit typically or more (typically 1000 nit or more), which applicant recently developed, which actually communicates the HDR image(s) as an LDR image plus metadata encoding color transformation functions comprising at least an appropriate determined luminance transformation for the pixel colors, to be used by the decoder to convert the received LDR image(s) into HDR images(s) which are a faithful reconstruction of the original master HDR image(s) created at the image creation side.
Figure 3:
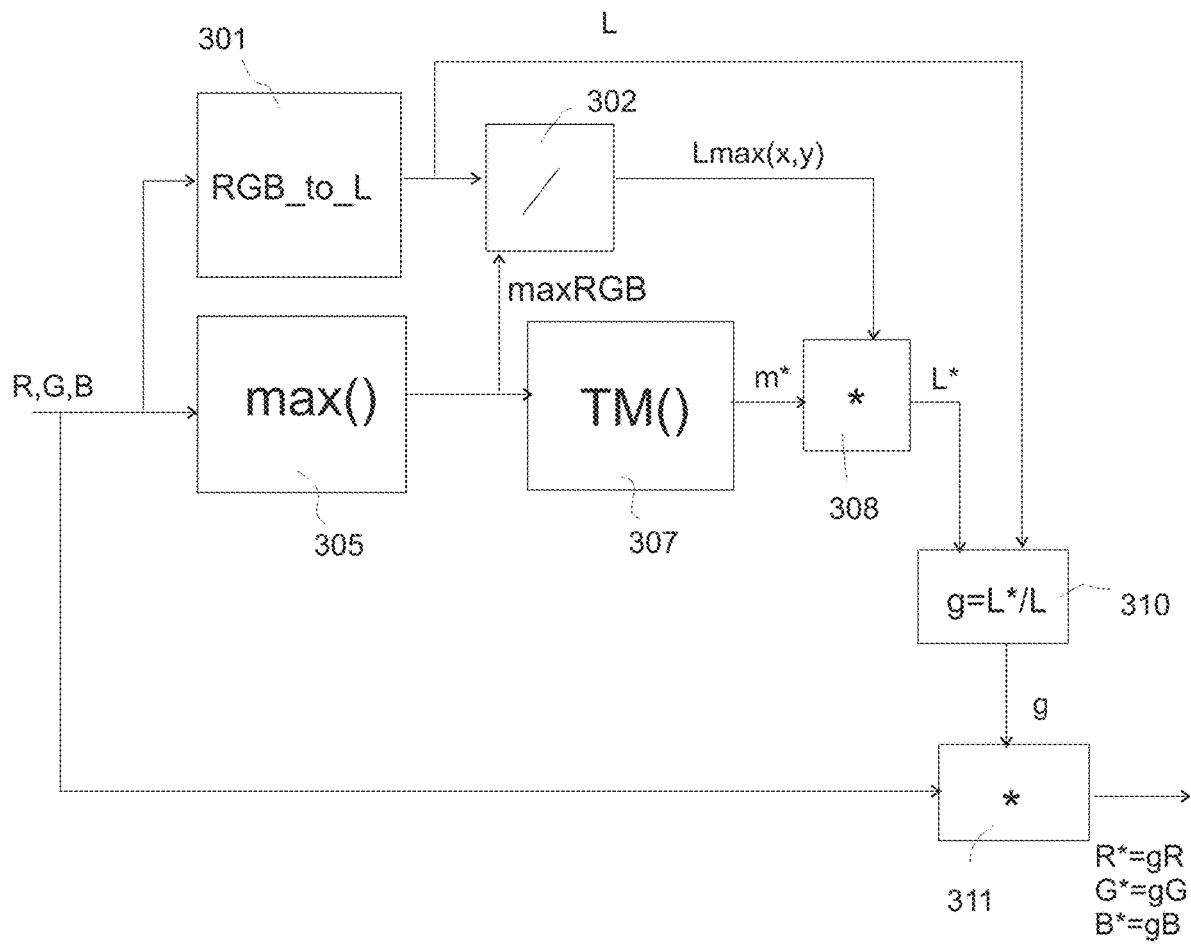
FIG. 3 schematically illustrates a first version technology of applicant which can be used to enable a within-gamut color (i.e. chromaticity)-preserving luminance transformation for changing the brightnesses of image objects or pixels for making them more conforming to what is needed in an image of a dynamic range which is different and specifically larger than the dynamic range of the input image, which works well for particular types of situations.
Figure 4:
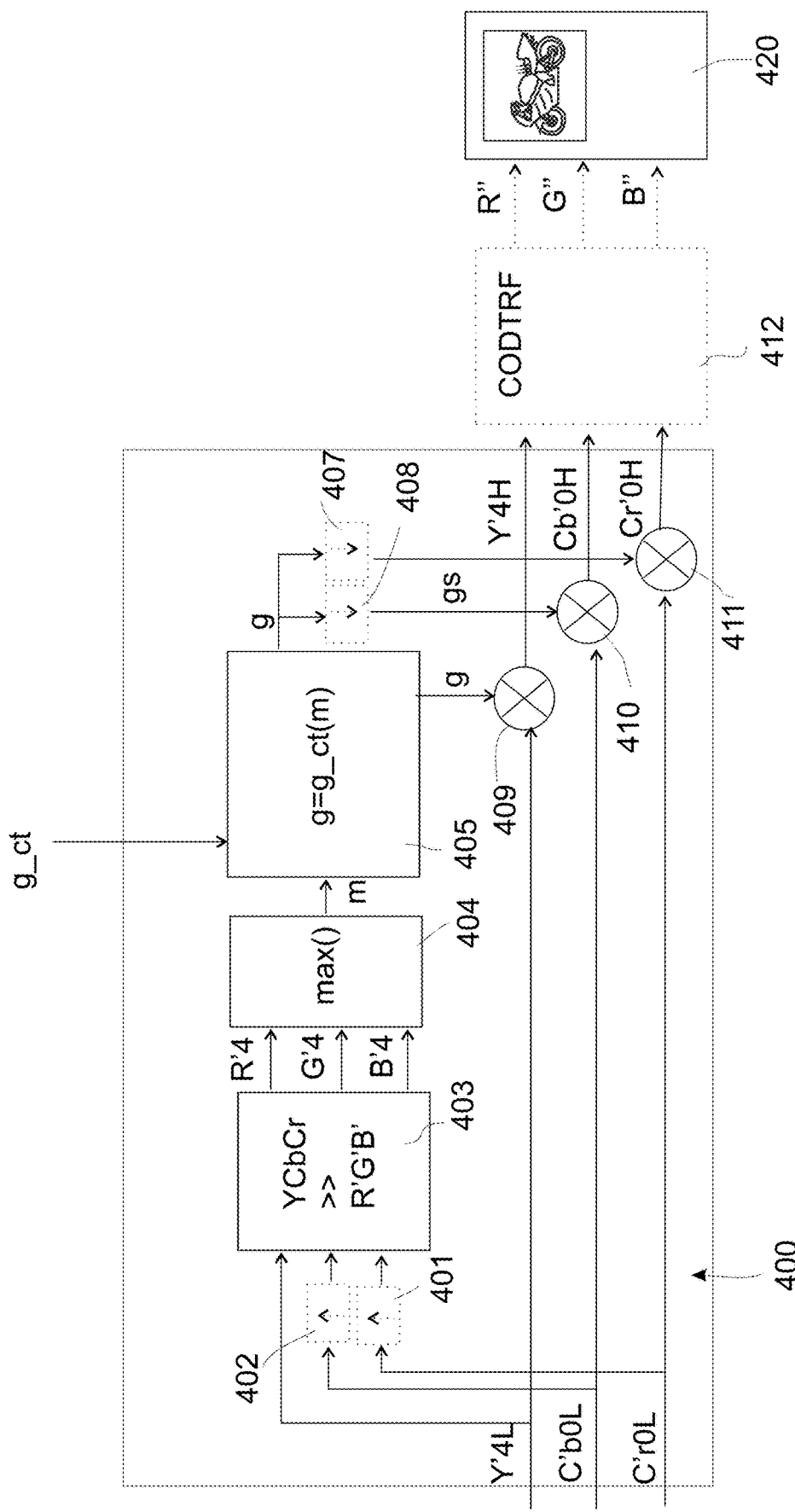
FIG. 4 schematically shows another possible embodiment of the core luminance transformations needed in encoder or decoder for transforming the image of first dynamic range into the image of second dynamic range, in particular reconstructing a HDR image from a received SDR image at the decoding side and vice versa at the encoding side, useful for the present technologies.

Finally linearization unit 705 converts the fully graded—as desired—pixel lumas for the SDR look image to the linear luminance domain, so that we can use this F(L_in) in the later determination of the gain factor g (in embodiments using the gain factor-based transformation) needed for ultimately doing the required color transformation on the three color components in a multiplicative manner (as was already elucidated with FIG. 3).

To understand better some of the below technical inventions, let's further discuss a typical mapping of an automatic algorithm determining the parameters for the encoder blocks (which will be used when the encoding will actually happen, i.e. an SDR image will be generated by applying the luminance transformation functions with those parameters, and the used parameters (or equivalently the function shapes themselves e.g. as LUTs) will be co-encoded together with the SDR images e.g. in SEI messages, so that a receiver can do the inverse color processing and reconstruct the HDR image(s) from the received SDR image(s)). And as said we don't intend this elucidation to be a limitation of our claimable scope, because a human grader can make similar considerations.

The automatic algorithm could use various heuristics to come to a good value of the black offset Bk_off, but simple algorithms will just determine it by mapping the lower parts of the curve following the cloud of SDR-HDR luminance points. I.e., in the example of FIG. 5 we see that a lot of this cloud follows a certain direction, and hence the low linear segment of the three-part curve will continue towards the x-axis (Y'_SDR=0) as the arrow indicates, and this intersection will define the black offset Bk_off. Otherwise the mapping when going with a linear part through (0,0) would lie quite high above the actual cloud for this particular HDR scene, but that should have a larger error, i.e. typically not come out of the automatic function estimation. As said, this going down straight to L_SDR=0 for L_HDR=Bk_off may create a beautiful SDR look, but: a bad reconstruction of the HDR image for the dark regions (because e.g. the 1-to-many inverse mapping of communicated Y'_SDR lumas cannot yield the correct HDR luminances).

Now the interesting part is that we have incorporated a gain limiter 707 in the encoder/encoding strategy, which will make sure that whatever at least automatic grading encoders do (i.e. trying to fit at least the three part curve, after determining a black offset) the lowest part of the final curve (for communication to receivers, enabling a good dual communication of a HDR grading as a SDR grading) is a safe curve for reconstruction. I.e., it should at least approximately encode what is in the darkest regions of the HDR scene and HDR master image thereof. There can be several manners to determine such a curve, which will typically in the simple embodiments happen by partial curve insertion, and oftentimes a fixed partial curve for the darks. Interestingly, since ICs and software should be as cheap as possible. At least, although in theory encoders could be complex, we want the decoders to have a relatively simple HDR image reconstruction principle. I.e. we don't prefer anything as complex as strange coding strategies which need complicated additional information. As we can see in FIGS. 5 and 7, we can embody this encoding strategy as a maximum calculation between the SDR determined value by the optimal luminance transformation (i.e. the r-shaped curve F(L_HDR), which would be bad below point 501), and the safe curve for the darkest regions. And for most cases we can use a relatively simple safe curve principle. Because we see from the dotted line continuing the lower curve (here in the example just a line) that above point 501 the correct luminance transformation curve F(L_HDR) will come out of the maximum calculation, and below point 501 because the slope respectively height of the luminance transformation F(L_HDR) is too low (in the example even clipped to zero) any suitably chosen partial curve with sufficient SDR codes to represent whatever semantically important image data is in these darkest HDR regions will come out of the maximum calculation.

To simplify further for understanding, we will assume the pragmatically simple embodiment of using a linear partial curve for transforming the darkest HDR pixels in region 502 to suitable SDR colors (which may then not be artistically optimal, but at least well-reversible to a HDR reconstruction image, and in many cases also pragmatically acceptable, visual quality-wise). This can be realized by multiplying in multiplier 706 the incoming pixel luminances L_in with a constant being dg. Note that in this particular embodiment linear luminances are multiplied, and they are compared— for the maximum determination—with the linear luminances of the upper parallel processing track having the artistically completely optimized mapping, after the re-linearization by unit 705. Such a multiplier can handle any scenario whatever the color space wherein L_in of the HDR image would be defined, and in particular it's PB_C. However, the factor dg should be suitably chosen. But the advantage is that it need not be encoded and transmitted as metadata to the receiver(s), if we assume that the decoders will just use good standard smart choices for the value of dg, or rather at their side 1/dg. A suitable choice may also be determined based on global properties of the HDR video as (co)communicated, like its PB and minimum value, and potentially even on further colorimetric aspects such as envisaged use of the images etc.

Figure 10:
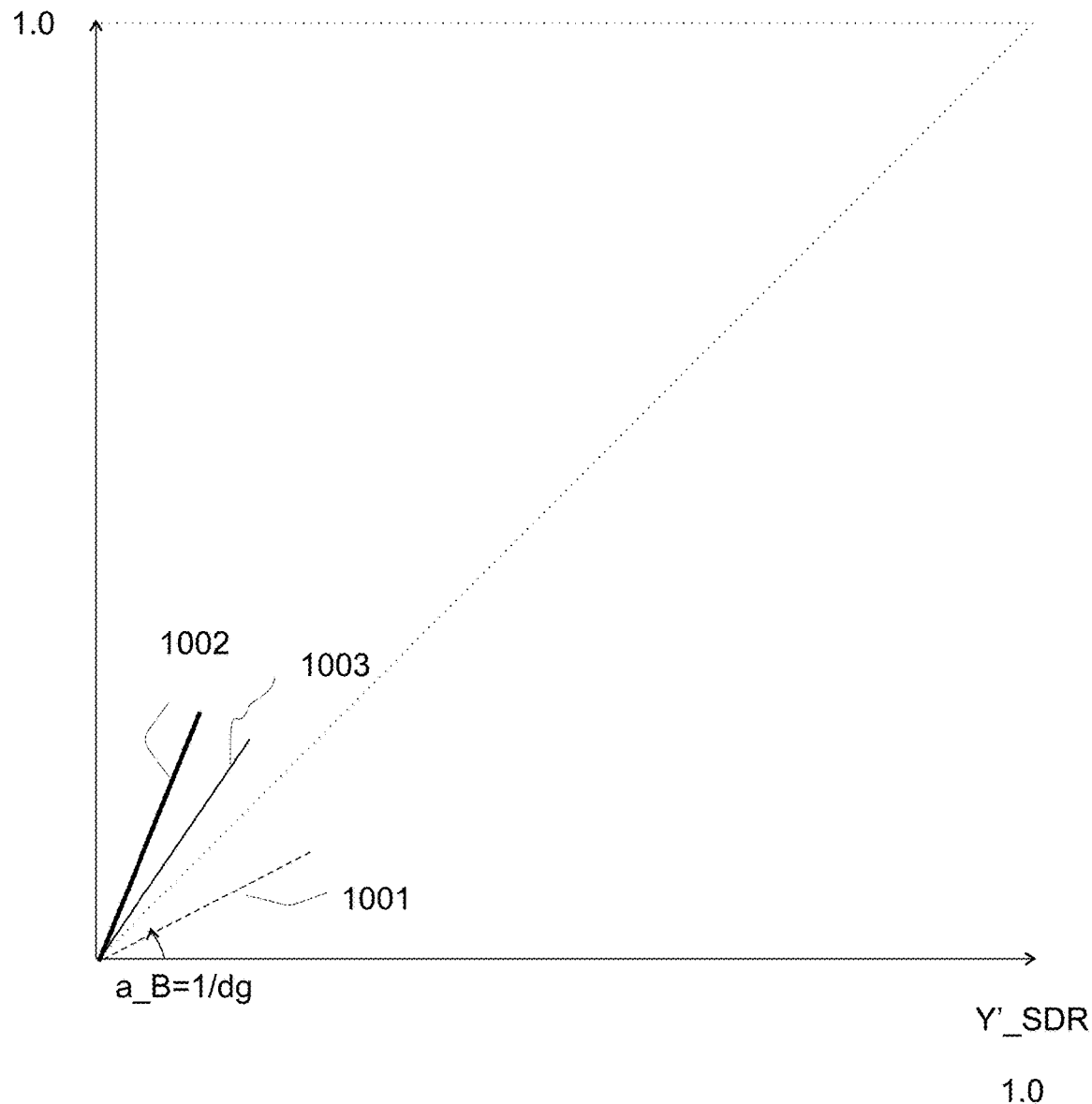
FIG. 10 zooms in on the area of the lowest HDR luminances (respectively the corresponding lowest SDR lumas) which need more careful handling than a mere artistic transformation, to elucidate both how the encoding and decoding luminance transformation shapes relate to each other via mirroring with respect to the diagonal, and how one can define a safe code allocation via a sufficiently large slope luminance mapping function partial segment starting from zero, and a maximization strategy.

That we can see better with FIG. 10. A linear mapping of a number of dark colors, can be seen as a boost (or if the boost factor is smaller than 1 a dimming boost). Note that in absolute luminances one may expect the HDR image to be (at least somewhat) brighter than the SDR image (a boost with k; k>=1), but it may also for the dark regions have the same luminances as the SDR image, as the SDR display cannot render bright colors but both displays can render dark colors similarly typically. And in some situations the HDR display could even show darker rendered colors for those darkest colors (e.g. an OLED HDR in a dark room compared to a legacy LCD LDR display). But in a relative system (i.e. both HDR and SDR luminances being fractions of maximum 1.0), to keep the HDR darks approximately equally bright as the SDR colors, whilst being referred to a PB_C which may be 10 or 100× brighter than 100 nit, one would do a dimming when mapping from SDR to HDR in a relative coordinate system, and a boosting when creating the transformation from HDR input to SDR as in FIG. 5 (where we can see e.g. the absolute value of 1 nit on both axes). So the local boosting for the darkest colors for mapping HDR-to-SDR being curve 1002 may be fine, and it corresponds to a SDR-to-HDR reconstruction partial (linear) curve 1001 being the mirror with same angle with respect to the diagonal. When using the curve 1002 for generating the SDR codes for the darkest HDR region, we may still have good reconstructability of the HDR image. But the automatic system or grader might select some curve which has a local segment which is lower, i.e. closer to the diagonal. The grader may do that because otherwise too many (SDR) codes are used for the darkest HDR region, and this has two effects he may not desire for the present image: 1) Some of the pixels of that region 502 which is supposed to be very dark (e.g. a room in the back where the lights are off as seen through a door opening) may become too bright, and also very inconvenient: 2) there may not be enough SDR codes to encode with sufficient quality all the luminances above point 501 (where there could be many HDR luminance regions to be well-represented, e.g. some lighter part of a view into a dark unlit cupboard, an inner corridor and far away from windows to the outside world, a region of average luminance being an office connected to the corridor via a glass window, and the sunny outside world as seen through windows on the other side of the office). So that is why he chooses such a low curve 1003 (and the automatic algorithm may do so because it blindly follows the data as in FIG. 5, whatever shape that luminance points cloud may happen to be).

So if at the encoder a minimal allowed value of dg is chosen (corresponding in this plot which shows the reconstruction of the HDR image from the SDR image, or more precisely as input its pixel's Y'_SDR values, with the corresponding receiver/decoder-side 1/dg value), then a lower value of a curve closer to the diagonal than curve 1002 will never be selected if the gain limiter 707 calculates the maximum of whatever F(L_in) that chosen curve calculates and that dg*L_in.

At the decoding side, partial curves which boost too much, i.e. closer to the diagonal from below it, cannot emerge from a minimum calculation with as second input the linear curve 1001, i.e. (1/dg)*Y'_SDR. Finally (since we tailored and explained this embodiment to work with classical, Rec709 interpretable SDR output images), a square root calculator 708 (or a Rec 709 OETF convertor) calculates form the linear luminance representation L_SDRout of the correctly graded pixel luminance for the pixel being processed a SDR luma Y'_SDR, which can be used as usual e.g. in HEVC video compression when this image is compressed for video communication. I.e. this communicated image is usable, and will by legacy systems be treated as a directly renderable good visual quality SDR image, i.e. with the lumas being defined as approximately the square root of the renderable SDR luminances. But, as explained, this image is also a coding of a HDR image, reconstructable by inversely applying the mathematical mappings of the upper track in FIG. 7 juncto the lower track, as shown in the exemplary SDR-2-HDR decoder of FIG. 6. There as shown dashed HDR luminances may also be represented by means of a square root operation, or another luma code allocation function as suitable for the application, e.g. communicating the image(s) from the decoder to a display on a connection with pre-agreed communication protocol properties.

The parameter dg depends on the peak brightness of the master HDR grading compared to that of the second grading, which in case of it being a SDR grading is always 100 nit (but the HDR PB_C may in some embodiments like grading for BD disk be 1000 nit, and in others 5000 or 10,000 nit, etc.).

A pragmatic good value of g depending on PB_C_HDR is in the linear domain dg_lin=0.05*PB_C_HDR/100 (i.e. at the encoder side, and at the decoder side our corresponding embodiments would use 1/dg). This linear 0.05 value corresponds in the pseudo-logarithmic domain with a value of 0.287. If the encoder knows the decoder will expect the darkest HDR luminances to be encoded in the SDR image (e.g. linearly in the simple embodiments) according to this value, it can create the SDR lumas in such a manner, and the decoder will correctly decode them with the 1/dg values, without needing any further information. Where that works nicely for most images and situations, in particular in automatic encoding systems, some images or situations may desire more precision and image-dependent optimization of the safe encoding of the lowest HDR luminances, as reflected in the partial luminance mapping curve for those darkest HDR luminances in region 502. We will show below how that can be done in a handy manner via the fine grading curve, e.g. the grader will shape its lowest part according to his preferences, so that it gives a better look for the SDR subregions of those dark HDR regions, yet still a good automatic reconstruction of the HDR image, given that selected custom curve being communicated in metadata (the curve to be applied in the decoder by unit 602).

After this explanation of the encoder, the units of one possible decoder embodiment of FIG. 6 can be understood by the skilled reader, as it is the inverse of the encoding. Now the fine grading unit 602 resets the pixel brightnesses of the precise lumas of the SDR input image to course lumas Y'R (i.e. as this can also be formulated: it does a re-grading in the SDR dynamic range). Subsequently dynamic range optimizer 603 calculates a scaled version Y'HPS of the HDR lumas (which still typically happens in the full range 0.0-1.0, now however being a relative representation of a HDR dynamic range). And finally range stretcher 604 positions these scaled versions correctly on the HDR luminances axis of e.g. a PB_C=5000 nit HDR representation, as said e.g. mapping the maximum scaled luma to 1500 nit (i.e. the 1.0 point of the image representation Y'HPS resulting from dynamic range optimizer 603, maps to 1500 nit, and not 5000 nit, because that was the brightest pixel in e.g. that shot of images of that scene currently being processed). Finally linearization unit 605 creates a luminance representation of the correctly reconstructed HDR luminance, but, still an intermediate one L_HDRIM, because the gain limiter 611 still needs to apply the correct coding-safe (alternative to the upper track of sequential re-grading processing) strategy for the darkest SDR lumas (which correspond to the original darkest HDR luminances in region 502 of the master HDR image at the creation/encoding side).

In general, this gain limiter 611 will apply the inverse of whatever mapping strategy was applied at the creation side. For simplicity of understanding, we will again assume that the linear strategy was used, with a suitable gain dg which can be calculated by any receiver based on the PB_C of the original HDR image which the received SDR image represents (which is also always communicated in metadata, otherwise the receiver cannot determine the correct luminance range of the Y'CbCr or RGB representation of the HDR image), as described above. In that very pragmatically simple useful embodiment the multiplier 610 will multiply Y'_in with 1/dg (in case of a generic HDR coding protection algorithm being used in the encoder and decoder, whatever scaling is needed can be taken into account directly in the gain limiter 611. So in the simple embodiment the gain limiter in the decoder calculates the minimum of L_HDR_IM and (1/dg)*Y'_in, yielding L_HDR_out. Some decoder embodiments will directly use that value for doing the final color transformation, e.g. in case chromaticities for the HDR image are converted to 3D colors by using the correct L_HDR_out. Other embodiments may desire a square root version of this (which is a Rec. 709 interpretation of the HDR image luminances), and in that case an optional square root calculator 612 may be present.

Figure 8:
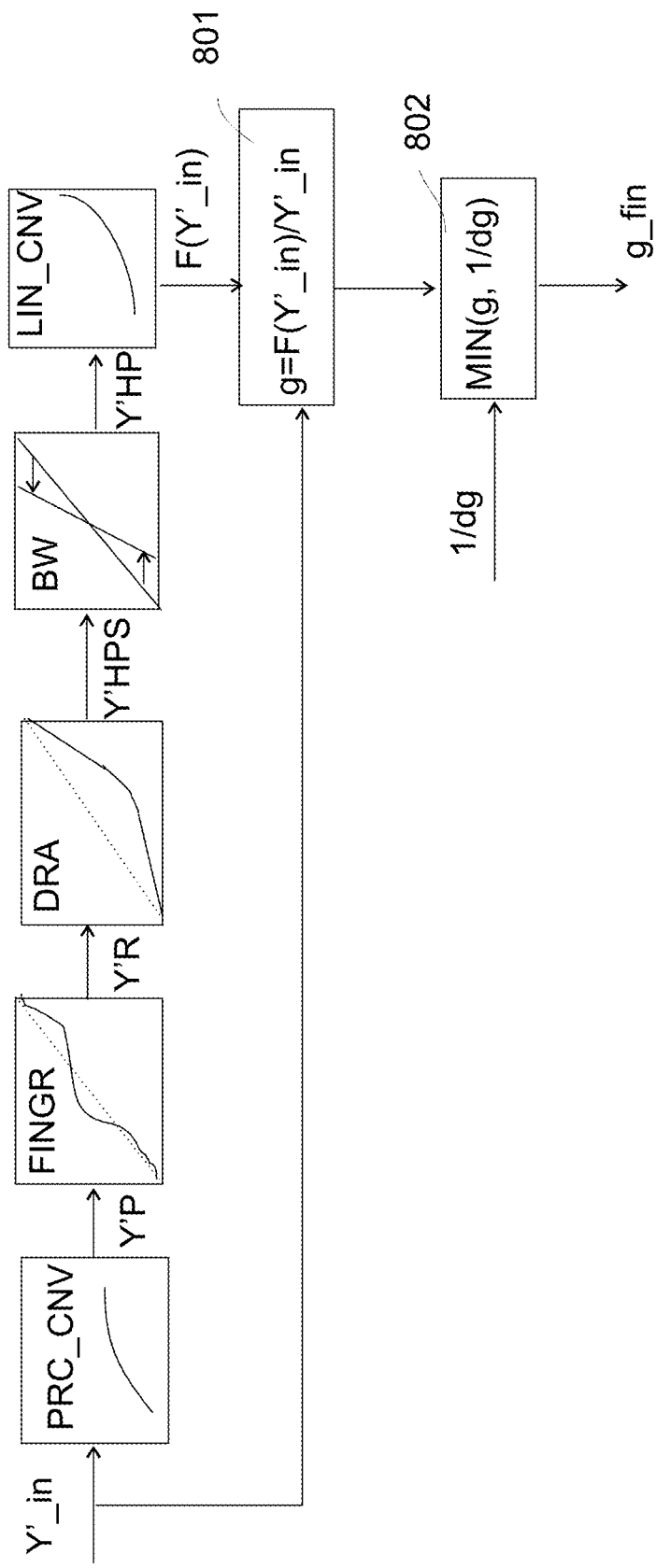
FIG. 8 schematically shows another possible decoder according to our presently taught new principles.

Because we have also taught a number of examples which do the color/luminance transformation of the decoding (re-construction to HDR) by means of a multiplicative factor g for multiplying the three color components by this g (in whatever form they may be, e.g. linear or non-linear RGB, YCbCr, etc.), We give another elucidating embodiment in FIG. 8. Whereas the above decoder used the principle of selecting a luminance, still to be used in the calculation of a g factor thereafter, one can learn from FIG. 8 that one can do the minimization strategy (or whatever correct good quality for the dark pixels decoding strategy in general), also based on the g values. All components of the upper branch are again as explained. Then gain calculator 801 calculates the gain by dividing the F(Y'_in) value, which was calculated by applying the various luminance transformation function shapes as determined by their codification in received metadata (i.e. e.g. SEI images containing a_d, a_H, and WP for the rough conversion, e.g. an 8 shape control point-based linear function for the fine grading function of unit 602, or a more precise LUT, etc.), i.e. without taking into account the particular (coding-safe) behavior for the darkest luminances. In this representation minimum calculation unit 802 now calculates the minimum of the gain g determined by gain calculator 801 and 1/dg as known (or in some embodiments one could also communicate a value for this dg as it was used at the creation side, should that deviate from the standard one of the above equation), yielding a final g_fin for multiplication with the three color components. The skilled reader can imagine a corresponding encoder, or how other strategies can mutatis mutandis be used for arriving at good g_fin values, e.g. receiving a LUT of g-values from the creation side for the darkest luminances.

Figure 9:
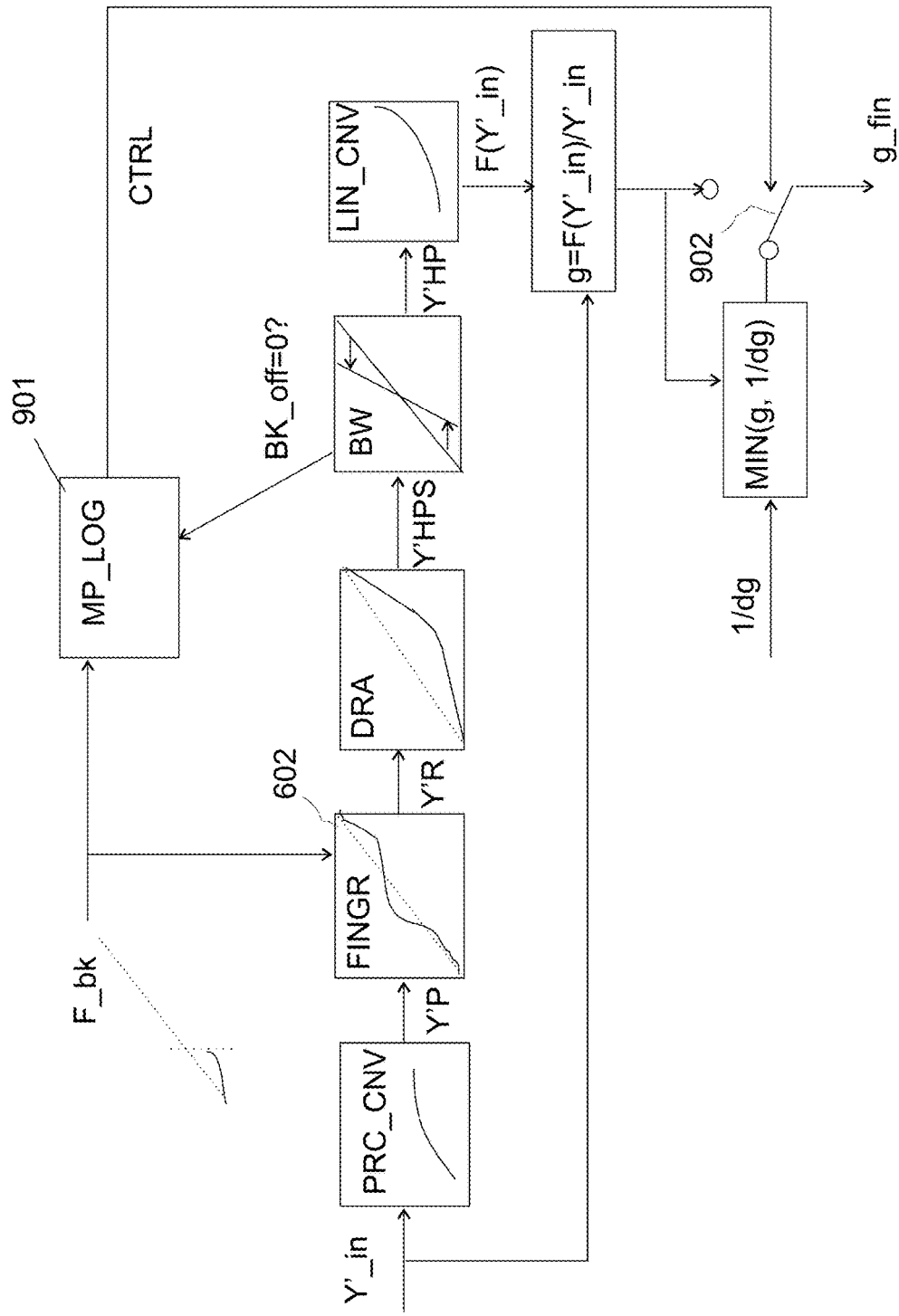
FIG. 9 schematically shows a third more complex decoder, which has a possibility to chose between decoding strategies, typically on the basis of how the content was encoded, and how that is determinable from the particular variants of the metadata encoding the luminance transformation which defines the decoding of the second dynamic range image(s) from the received first dynamic range image(s)

More interestingly FIG. 9 gives a more complex embodiment of a HDR decoder as one may put it in systems which may get various content which has been created in various manners, in particular as to the possibilities for determining a good strategy for encoding the region 502 darkest luminances of the HDR image as a good subset of the darkest SDR lumas. Such an IC or software may reside e.g. in a TV or STB which may both get high quality graded movie material, e.g. a set of SDR (or HDR) images communicated together with the metadata of the necessary color transformation functions (in general apart from what we explained to elucidate this invention, there may also be specific color transformations, e.g. modifying the saturation of the pixel colors), over the internet from a movie delivery server, or a simple television broadcast via a satellite connection. In this example we assume that e.g. a human grader has created a better strategy for mapping the darkest HDR luminances than the above linear one. He may do this via a partial function F_bk. Although the linear one is a strategy which is pragmatically simple yet will work fine in most cases, with the more complex also still coding-safe alternative/parallel strategy for the darkest HDR scene pixels the grader could incorporate a specific grading behavior for the ultra-darks, in case that HDR scene would still need that. In various embodiments there are several ways to do this, e.g. he may communicate this partial shape via the LUT codification of the fine grading luminance mapping to be loaded into unit 602, i.e. as a single function. Alternatively he may communicate a partial function which is to overrule the shape of the lowest part of the fine grading luminance mapping function, etc. Now the behavior of the gain limitation should in that case be determined by the e.g. grader-determined shape of the lowest part of that fine grading function, i.e. the Minimum calculation should be bypassed (i.e. that decoder should have a control mechanism detecting the situation, whether it is the first one with the simple strategy for the alternative/parallel decoding of the ultra-darks, or darkest darks, or whether the more sophisticated alternative strategy for the ultradarks was used at the encoding side), however, if other e.g. coarsely automatically graded content comes in (e.g. because the viewer switches to a cable or satellite-supplied video program), the linear-based version explained with FIG. 6 should (again) apply. A useful embodiment is to do this fine grading-curve based approach by setting the black offset (BK_off) to zero, and then determining in the fine grading curve a mapping for all HDR luminances to SDR starting from L_HDR=0 (i.e. at the decoder side, whatever the shape of the fine grading function, L_in values which are zero (of the HDR image) would typically map to Y'_SDR lumas being zero, and not like in FIG. 5 where the HDR luminance of point 501 would already map to zero; i.e. if one only applied the upper branch of luminance transformation-based processing, and not the gain limiting with the linear part with slope dg). A processor 901 running a checking program will check this situation: in case the black offset Bk_off is zero, the fine grading curve-based decoding should happen for the very darkest SDR lumas, and in case it isn't, the strategy which calculates the minimum of the F(Y'_in)-respectively g in the other decoder embodiment- and the linear 1/dg-sloped SDR decoding should occur. Hence, the processor 901 sends a control signal to switch 902, selecting whichever variant is appropriate for the given situation.

Figure 12:
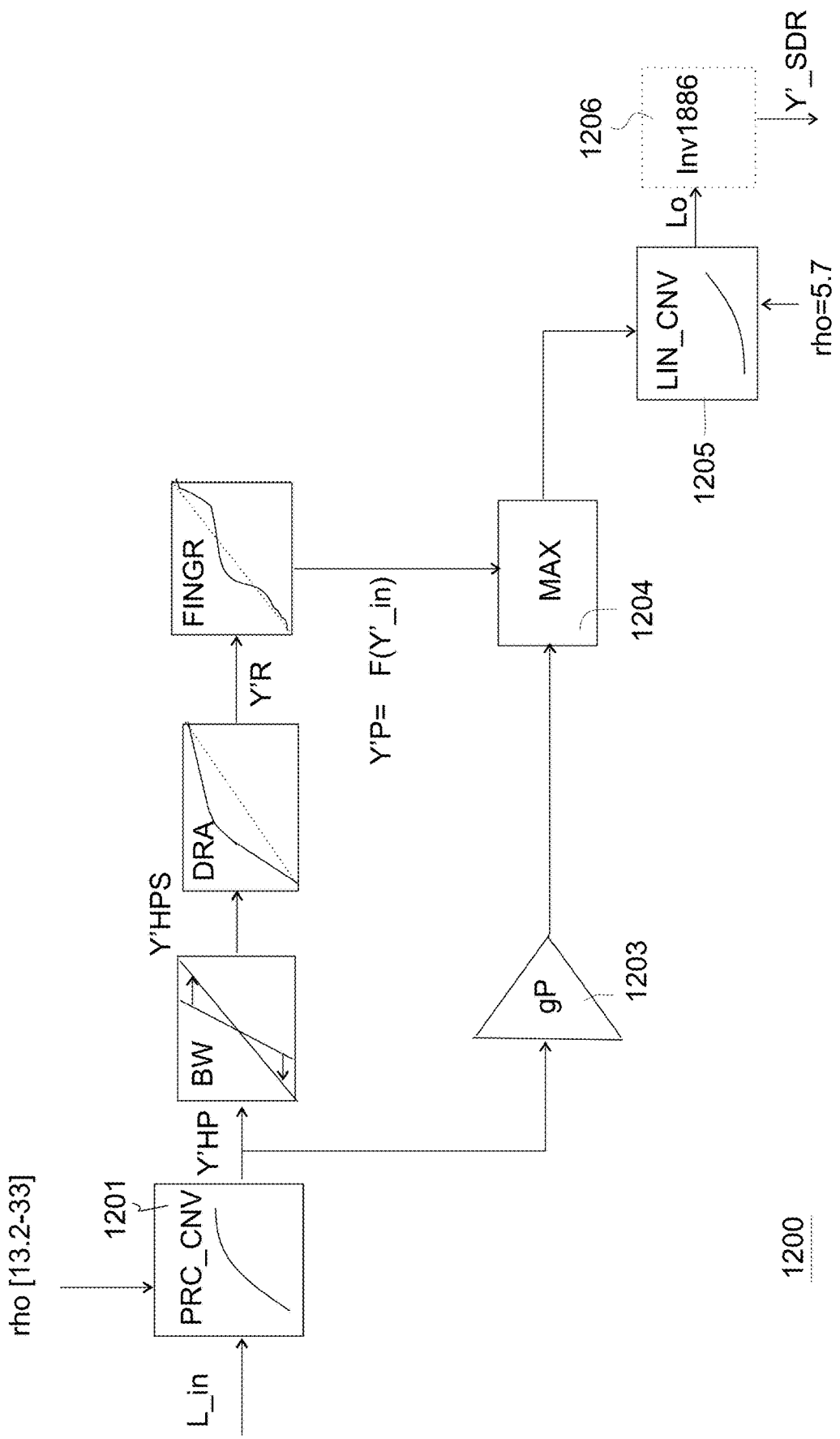
FIG. 12 schematically shows a corresponding encoder embodiment.

FIG. 12 shows another encoder (1200) embodiment, which research has shown is particularly interesting, especially if used with our Philips perceptualization curve e.g. with rho=25. Our equation 1 has a PB_C dependent rho value, for which we can use an allocation function which is also used (i.e. known) by the decoder, hence then only the PB_C value needs to be communicated, e.g. PB_C=33 for 10,000 nit PB_C, 25 for 5000, 13.2 for 1000 (a PB_C of 100 nit would correspond to 5.7, although that is no PB_C value for HDR image codings obviously, so only for mapping SDR images to our Philips perceptual luma domain). An equation for getting rho for any PB_C can be: Rho (PB_C)=1+(33−1)*power(PB_C/10000;1/(2.4)), and for HDR encodings PB_C would typically be above 800 nit.

The various units (custom curve shape-based fine-grading, three-part curve coarse grading based on control of the contrasts for the darks and the brights of the image, and the black and white offset) may again be understood as the same or similar to above embodiments. I.e. e.g. a grader (or automatic grading apparatus) decides he wants to map the brightest luminance (actually technically implemented as the corresponding brightest luma) of the HDR image to typically the maximum of the SDR lumas (i.e. e.g. 1023 in 10 bit encoding), and perhaps also the black is shifted, typically to the lowest SDR code (0). Then he does a coarse look adjustment of the brights and the darks, allocating ranges, average brightnesses and contrasts to those parts of the image by selecting the curve shape, e.g. brighten the darkest parts of a night scene which would otherwise with their HDR image luma values look too dark on SDR displays. So e.g. he specifies the range 0-M1_HDR for the ultradarks, and maps that with a linear curve in the perceptual representation to 0-M1_SDR, and similarly he maps M2_HDR-1 to M2_SDR-1 corresponding again to a linear mapping in that sub-range of the brightest luminances. He then specifies, or that grading device/coder specifies itself some smooth connection function for in-between luminance values. The grader then shifts the luminances of some objects, or actually their corresponding lumas (lying along respective luminance sub-ranges) to more appropriate positions to make e.g. a face look cleaner, or some lamp in the scene somewhat brighter, etc, with the elected fine grading curve. This yields SDR "brightnesses", or more precisely lumas in the perceptually uniform brightness representation (Y'P).

The difference is now that the maximum calculation (or in general equivalent determination of the more suitable of the coding strategies for the darkest SDR lumas Y'_SDR to be output) is performed in the perceptualized domain. Thereto an optimal constant gP must be determined in this domain, for multiplying with the perceptualized HDR lumas Y'HP (as calculated by perceptual space conversion unit 1201) by multiplier 1203. In such encoder embodiments the linearization unit 1205 comes in circuit connection order after the gain limiter (1204), rather than before it, because the maximum calculation is also happening in perceptual space.

From research the inventors found it well-performing on all typical HDR test images if this strategy made a code peak brightness (PB_C, i.e. of the master HDR image to be encoded) independent allocation of a sub-range of the darkest HDR colors [0 to HDRL] to a sub-range of the darkest of the SDR colors [0-SDRL], in a linear manner in perceptual space, i.e. which can be represented by a multiplicative constant, namely gP.

From experimentation it was found that the perceptual luma corresponding to a HDR luminance of 1 nit (always, irrespective of what the peak brightness of the HDR image to be coded is) is good to use for the HDRL value, and a perceptual luma corresponding to 0.1 for the SDRL upper threshold.

The multiplicative value gP can then be encoded as:

$$gP=PH(0.1/100, 100)/PH(1/PB\_C,PB\_C). \quad [\text{Eq. 2}]$$

In this notation PH is the formula of our equation 1 above, and more precisely the value of the relative function which comes out if the input is the first value before the comma. So the first PH is the functional shape when used up to a maximum code peak brightness for SDR being typically 100 nit (and otherwise instead of 100 one fills in PB_C_SDR, e.g. 200, but we keep things simple in this elucidation of the embodiment's principles), and we take the output value for an input of 0.1, so $1/1000^{th}$ of the maximum possible SDR luminance (100). Similarly, the second part, the denominator of the division, is the luma value that results from inputting into the Philips perceptual function PH (which is now however supposed to cover a range up to what the HDR input image needs, e.g. PB_C=5000 nit, which is indicated by the PB_C after the comma), the value corresponding to the 1 nit HDR luminances, i.e. a relative value of 1/PB_C, e.g. 1/5000 in case of 5000 nit PB_C. One could approximate this by gP+−=0.67 log(PB_C)/log(1000).

Interestingly, embodiments where we choose the rho-value of the PH function fixed (and the gamma value also, typically 2.4), need no communication of the selected gP value from the encoding site to any receiving side (although some embodiments could do so), and the decoder can calculate his needed inverse constant 1/gP itself by merely getting communicated what the peak brightness of the HDR code (or the SDR image actually communicating this HDR image) is, which one needs to have communicated anyway, since one needs to know with which to be rendered white luminance the code R=G=B=1023 is actually to corresponds. So one can save on communication bits, which also means that if metadata is not needed it cannot be lost or corrupted, with ensuing erroneous consequences. That is provided encoder and decoder have also pre-agreed (because of the encoding algorithm they use, e.g. HEVC-profile-X) on the e.g. 1 nit and 0.1 nit of the mapping of the darks.

Experiments have led to the results that if one uses the inverse of the recently standardized Rec. 1886 EOTF (rather than as was classically done use the Rec. 709 OETF) in the SDR luma encoding unit (1206) to calculate the actual SDR lumas Y'_SDR to be put in the SDR image signal and communicated to receivers, then one has about 50 luma codes for coding whatever image structure is present in the ultradarks of the HDR scene image, i.e. pixels with luminances below 1 nit. The EOTF we typically use for this will be L_out=a*power((Y'_SDR+b); 2.4), with a=1.0 and b=0. The Y'_SDR lumas are the ones written in the file, and representing at the same time the pixel brightnesses of the SDR look that has been created for the master HDR image(s), as well as the brightnesses in those master HDR images, provided of course those are calculated by applying our color transformation functions, in particular our luminance transformation functions. What Rec. 1886 defines as an output rendered luminance L_out on a standard SDR monitor, will as said for us be input for the inverse of this EOTF, i.e. an OETF converting luminances into luma codes. The luminances will be the representatives of the HDR master luminances, after we have converted those to a 0-100 nit luminance range, or any corresponding equivalent luma range, i.e. they are the Lo values of FIG. 12 are SDR-dynamic range contained luminances, corresponding to input HDR lumas Y'_in, being e.g. exactly or approximately the square root of the original master HDR image pixel luminances.

One should cater for various usage scenarios, as our encoder might be used both for direct consumption, or master storage of original video which may be used years later on higher quality rendering systems. The ultradarks could be rendered both on classical television systems, where anything below 0.1 nit is usually not that interesting, or not even seen because of reflection of room light on the display face plate, but the images may also be rendered in dark environments on displays capable of rendering deep blacks like OLEDS, and, it may even be so that the display or apparatuses delivering images to it uses internal brightening algorithms increasing the luminance of the darkest colors somewhat. However, despite that HDR images may well in addition to many very bright objects also contain very dark regions (e.g. in night scenes), about 50 luma codes should be sufficient for such regions which because they are dark will neither by perfectly visible, nor typically the most important part of the image (and all image detail is still represented with about a fifth of the amount of codes that were used to "perfectly" represent all kinds of images in the LDR/SDR era). The reader should also note that in this embodiment the processing starts on input HDR luminances L_in, i.e. whether simply the HDR luminances are used, or they are still inputted as some function of the linear luminances, e.g. a square root, is a technical circuit design option that one can vary liberally combined with all other parts of the present application teachings.

Figure 11:
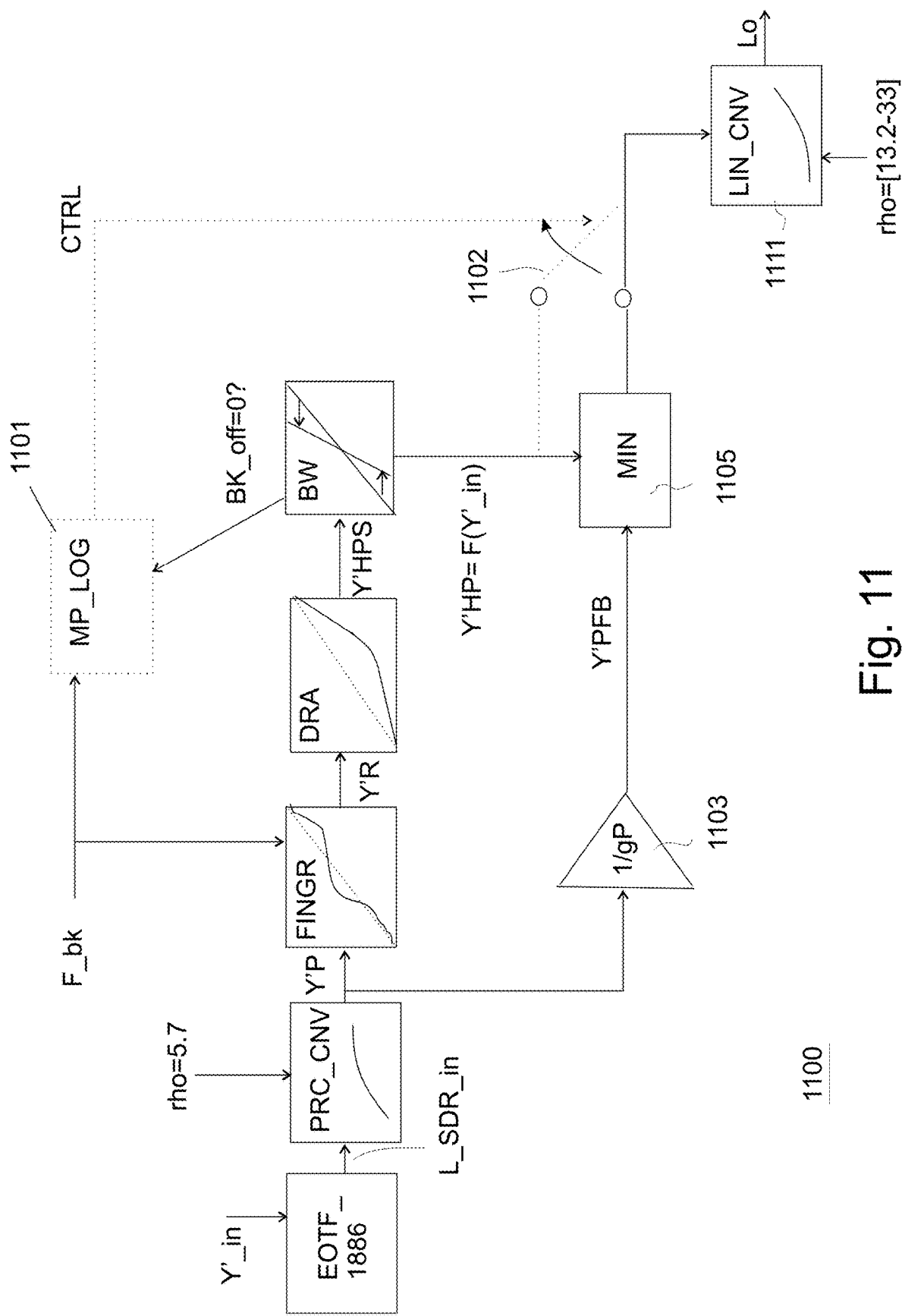
FIG. 11 schematically shows for elucidation another embodiment of a useful decoder embodiment.

Because the skilled reader can now start to understand how to design the various combinatorics alternative variants of our principle, FIG. 11 shows two interleaved embodiments of a decoder (1100) which corresponds to the FIG. 12-type of encoder(s). We have shown dashed that some embodiments can have a situation conditional check by processor 1101 (as elucidated already similarly with FIG. 9), as to whether the decoding of the darkest pixels of the received SDR image would be decoded with the minimization strategy, or whether a switch 1102 would bypass that, and all decoding would be handled purely from the received functions, which function as a code determination, able to convert received SDR lumas Y'_in into the reconstructed HDR luminances Lo, as they would be needed. The multiplier 1103 now uses the inverse constant 1/gP, which as said, in many practical embodiments can be calculated (typically once per movie, or in general new received content, such as after a channel switch) by the receiving device, as it knows what the encoder would similarly have used. So some embodiments would always use the circuit with the gain limiter 1105, without the optional control loop from processor 1101 being present. The skilled reader should also understand that our principles don't disallow that a 1/gP value is actually communicated, e.g. stored on a sector of a disk, or in metadata co-communicated with a received signal, etc.

To be able to use our Philips perceptualization function with rho=5.7, we first apply the Rec. 1886 EOTF (with b=0, and a=0) to the received SDR lumas Y'_in (as they were communicated in the e.g. HEVC image encoded signal), to get normalized linear SDR luminances L_SDR_in as starting point (of course in some embodiments those two units could be combined, as it will be a fixed LUT, since because of the standardized 100 nit PB_C of SDR, rho is always 5.7 if such encodings are used as input, which is the likely way our embodiment will be used, at least in the foreseeable future). The linear conversion of unit 1111 will again have a rho which depends on the received value of PB_C indicating which HDR coding was used.

Figure 13:
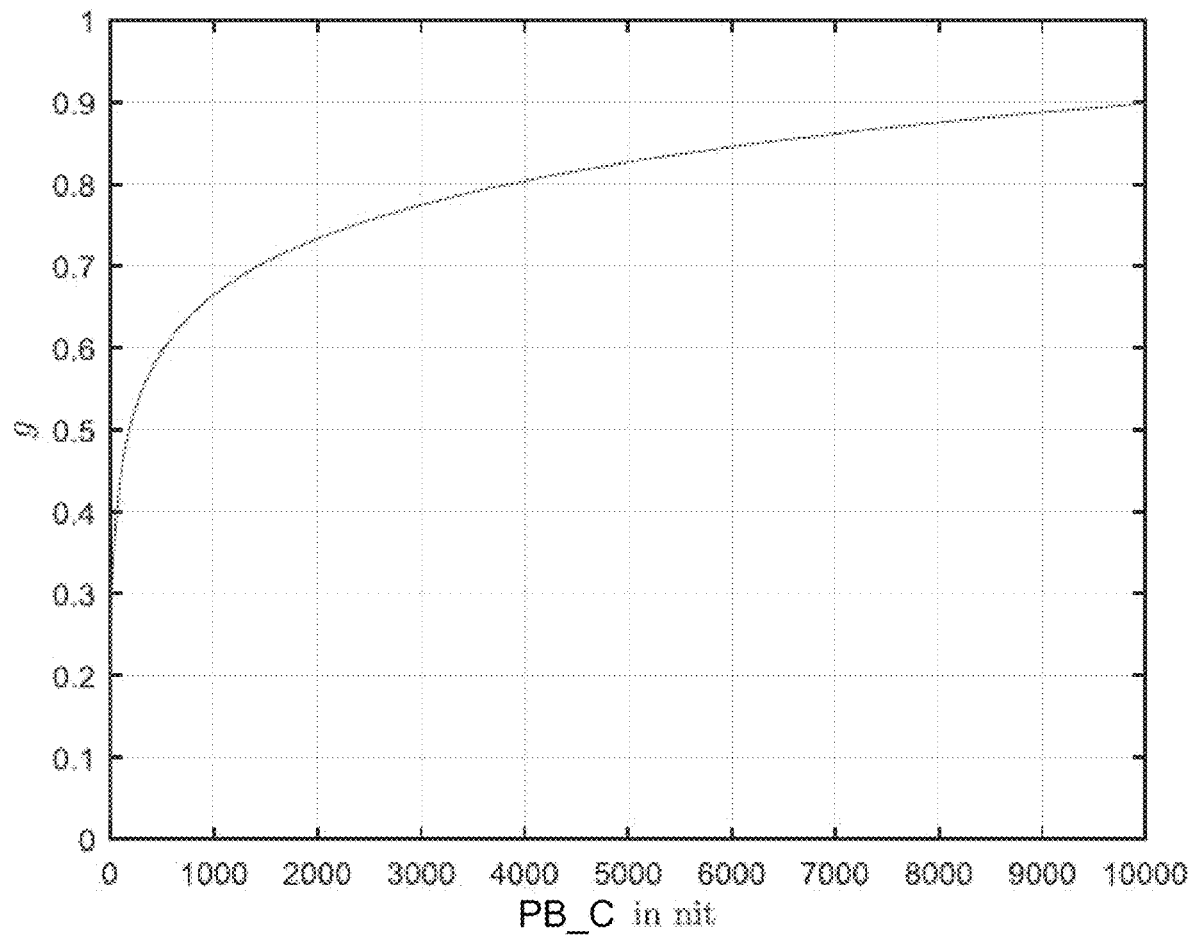
FIG. 13 schematically shows multiplicative constants gP for the linear bottom part for the darkest colors in perceptual luma domain of the gain limiting strategy, for various possible code peak brightnesses PB_C.

FIG. 13 shows some typical values of g, for possible PB_C code peak brightnesses (i.e. not necessarily the brightest luminance in the image, but what the image could contain (if all the codes was used, i.e. the brightest pixel was at maximum), and the coding should be able to handle). One can encode this e.g. as a LUT and put it in the decoder hardware.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. A high dynamic range video decoder circuit comprising:
   a dynamic range optimizer circuit, wherein the dynamic range optimizer circuit comprises a luma mapper and a range stretcher,
      wherein the luma mapper is arranged to apply a first luma mapping to an input pixel luma of an input image yielding an intermediate pixel luma,
      wherein the range stretcher is arranged to map the intermediate pixel luma to an offset when the value of the intermediate pixel luma is zero yielding a first luma; and
   a gain limiter,
      wherein the gain limiter is arranged to apply a second luma mapping to the input pixel luma,
      wherein the second luma mapping is applied to the input image luma to obtain a second luma,
      wherein the gain limiter is arranged to select as output luma the smaller one of the first luma and the second luma.

2. The high dynamic range video decoder circuit as claimed in claim 1, in which the input image is a standard dynamic range image.

3. The high dynamic range video decoder circuit as claimed in claim 1,
   wherein the high dynamic range video decoder circuit comprises a receiver circuit,
   wherein the receiver circuit is arranged to receive metadata,
   wherein the metadata comprises at least one of the first luma mapping and the offset value in metadata.

4. The high dynamic range video decoder circuit as claimed in claim 1,
   wherein the input luma is a perceptually uniform luma,
   wherein the second luma mapping is a multiplication of a constant (1/gP) by the input luma.

5. The high dynamic range video decoder circuit as claimed in claim 4,
   wherein the perceptually uniform luma is calculated from a starting luma by applying a function:

$YP = \log[(1+(rho-1)*power(L\_SDR\_in, 1/2, 4)]/\log(rho)$, wherein L_SDR_in are linear luminances,
   wherein rho is a constant.

6. The high dynamic range video decoder circuit as claimed in claim 4,
   wherein the constant (1/gP) is determined by the high dynamic range video decoder as a function of a received value,
   wherein the received value is a peak brightness of an encoding of the high dynamic range image.

7. The high dynamic range video decoder circuit as claimed in claim 1, wherein the dynamic range optimizer circuit comprises a luminance fine grading circuit.

8. The high dynamic range video decoder circuit as claimed in claim 3,
   wherein the high dynamic range video decoder circuit comprises a processor circuit,
   wherein the processor circuit is arranged to apply a third luma mapping if the value of the offset is zero.

9. A high dynamic range video encoder circuit comprising:
   a dynamic range optimizer circuit, wherein the dynamic range optimizer circuit comprises a luma mapper and a range stretcher,
      wherein the luma mapper is arranged to apply a first luma mapping to an input pixel luma of a an input image yielding an intermediate pixel luma, and
      wherein the range stretcher is arranged to map the intermediate pixel luma to a zero when the intermediate pixel luma is equal to an offset yielding a first luma,
   a gain limiter,
      wherein the gain limiter is arranged to apply a second mapping on the input luma yielding a second luma,
      wherein the gain limiter is arranged to determine an output luma of a pixel by selecting the larger one of the first luma and the second luma.

10. The high dynamic range video encoder circuit as claimed in claim 9, wherein the output luma of the pixel is a portion of a standard dynamic range image.

11. The high dynamic range video encoder circuit as claimed in claim 9,
    wherein the high dynamic range video encoder circuit calculates a perceptually uniform luma,
    wherein the second luma mapping is a multiplication of a constant by the values of the perceptually uniform luma.

12. A high dynamic range video encoder circuit as claimed in claim 9, further comprising a transmitter,
    wherein the transmitter is arranged to transmit metadata,
    wherein the metadata comprises at least one of the first luma mapping and the offset value.

13. A method of high dynamic range video decoding comprising:
    receiving an input image
    calculating a high dynamic range image from the input image,
      wherein the high dynamic range image comprises at least one output pixel,
      wherein the at least one output pixel has an output luma,
      wherein the calculating comprises:
        applying a first luma mapping to a input pixel luma of the input image yielding an intermediate pixel luma; and
        applying a stretched range mapping to the intermediate pixel luma to an offset when the value of intermediate pixel is a zero yielding a first luma;
        determining a second luma mapping function,
        calculating a second luma using the second luma mapping function,
        selecting an output luma as the smaller one of the first luma and the second luma.

14. The method of high dynamic range video decoding as claimed in claim 13,
    wherein the calculating of the second luma comprises determining a perceptually uniform luma,
    wherein the calculating of the second luma comprises multiplying the perceptually uniform luma by a constant (1/gP).

15. A method of high dynamic range video decoding as claimed in claim 13 wherein at least one of the first luma mapping and the offset value are received as metadata.

16. A method of high dynamic range video encoding comprising:
   applying a first luma mapping to an input luma of an input image yielding an intermediate pixel luma;
   applying a stretched range mapping to the intermediate pixel luma to a zero when the intermediate pixel luma is equal to an offset yielding a first luma; and
   calculating a second luma the calculating comprising:
      applying a second luma mapping to the input luma,
      selecting the output luma to be the larger one of the second luma and the first luma.

17. The method of high dynamic range video encoding as claimed in claim 16 further comprising transmitting metadata, wherein the metadata comprises at least one of the first luma mapping and the offset value.

* * * * *